US006535788B1

(12) United States Patent
Yoshida et al.

(10) Patent No.: US 6,535,788 B1
(45) Date of Patent: Mar. 18, 2003

(54) MACHINING APPARATUS

(75) Inventors: Jun Yoshida, Kanagawa (JP); Akira Kawana, Kanagawa (JP); Shinichi Inoue, Kanagawa (JP); Tatsuya Hisaki, Kanagawa (JP)

(73) Assignee: Makino Milling Machine Co., LDT, Tokyo (JP)

( * ) Notice: Subject to any disclaimer, the term of this patent is extended or adjusted under 35 U.S.C. 154(b) by 0 days.

(21) Appl. No.: 09/554,029

(22) PCT Filed: Aug. 17, 1999

(86) PCT No.: PCT/JP99/04418

§ 371 (c)(1),
(2), (4) Date: May 4, 2000

(87) PCT Pub. No.: WO00/15385

PCT Pub. Date: Mar. 23, 2000

(30) Foreign Application Priority Data

Sep. 14, 1998 (JP) .......................... 10-260519

(51) Int. Cl.⁷ .................. G05B 13/02; G05B 19/42; G06F 17/00; G06F 19/00
(52) U.S. Cl. .................. 700/191; 700/36; 700/87; 700/180; 700/188; 705/400
(58) Field of Search .................. 700/36, 87, 169, 700/172, 173, 175, 178, 180, 183, 184, 188, 192, 159, 160, 190, 191; 705/400

(56) References Cited

U.S. PATENT DOCUMENTS

| | | | |
|---|---|---|---|
| 4,926,338 A | | 5/1990 | Nankaku |
| 5,249,120 A | * | 9/1993 | Foley .......................... 700/36 |
| 5,251,145 A | * | 10/1993 | Yamamoto et al. ......... 700/180 |
| 5,406,494 A | * | 4/1995 | Schuett ....................... 318/569 |

(List continued on next page.)

FOREIGN PATENT DOCUMENTS

| | | |
|---|---|---|
| JP | 61-105611 | 5/1986 |
| JP | 62-140741 | 6/1987 |
| JP | 2-178711 | 7/1990 |
| JP | 3-251907 | 11/1991 |
| JP | 3-294146 | 12/1991 |
| JP | 4-138504 | 5/1992 |
| JP | 4-315550 | 11/1992 |
| JP | 5-77138 | 3/1993 |

(List continued on next page.)

OTHER PUBLICATIONS

Japanese Unexamined Utility Model Publication (Kokai) No. 2–143140, dated May 12, 1990.
Japanese Publication No. 05 146945 (English Abstract).
Japanese Publication No. 09 305665 (English Abstract).
Japanese Publication No. 61 105611 (English Abstract).

*Primary Examiner*—Leo Picard
*Assistant Examiner*—Elliot Frank
(74) *Attorney, Agent, or Firm*—Paul & Paul

(57) ABSTRACT

A control device of a machine tool (100) has an input unit (1) for inputting the processing profile data (1a) and the workpiece data (1b) of the material and a profile of the workpiece to be processed. The control device input unit (1) also can receive a tool path changing operation command (1c), a manual operation command (1d) and a processing condition changing command. A data base (3) for storing at least one of the mechanical data of the machine tool to process the workpiece and the tool data of the tool mounted on the machine tool provides a signal to an estimating calculation unit (7) for estimating at least a processing load or the occurrence of interference of the tool with the workpiece based on the data inputted by the input unit (1) and the data stored in the data base (3). A tool path deciding unit (5) calculates a tool path to process the workpiece and decides processing conditions such as spindle rotating speed and the feed speed for the machine tool (11) based on the output of the estimating calculation unit (7).

8 Claims, 29 Drawing Sheets

U.S. PATENT DOCUMENTS

| | | | |
|---|---|---|---|
| 5,655,087 A | * 8/1997 | Hino et al. | 606/62 |
| 5,827,020 A | * 10/1998 | Fujita et al. | 318/571 |
| 5,828,574 A | * 10/1998 | Robinson et al. | 700/173 |
| 5,903,474 A | * 5/1999 | Sadler et al. | 700/159 |
| 5,923,132 A | * 7/1999 | Boyer | 318/34 |
| 6,428,252 B1 | * 8/2002 | Oldani | 409/132 |

FOREIGN PATENT DOCUMENTS

| | | |
|---|---|---|
| JP | 5-146945 | 7/1993 |
| JP | 6-102923 | 4/1994 |
| JP | 6-119029 | 4/1994 |
| JP | 6-138929 | 5/1994 |
| JP | 6-170694 | 6/1994 |
| JP | 7-251349 | 10/1995 |
| JP | 8-132332 | 5/1996 |
| JP | 8-234821 | 9/1996 |
| JP | 8-276348 | 10/1996 |
| JP | 9-26811 | 1/1997 |
| JP | 9-85579 | 3/1997 |
| JP | 9-305665 | 11/1997 |
| JP | 10-58280 | 3/1998 |

* cited by examiner

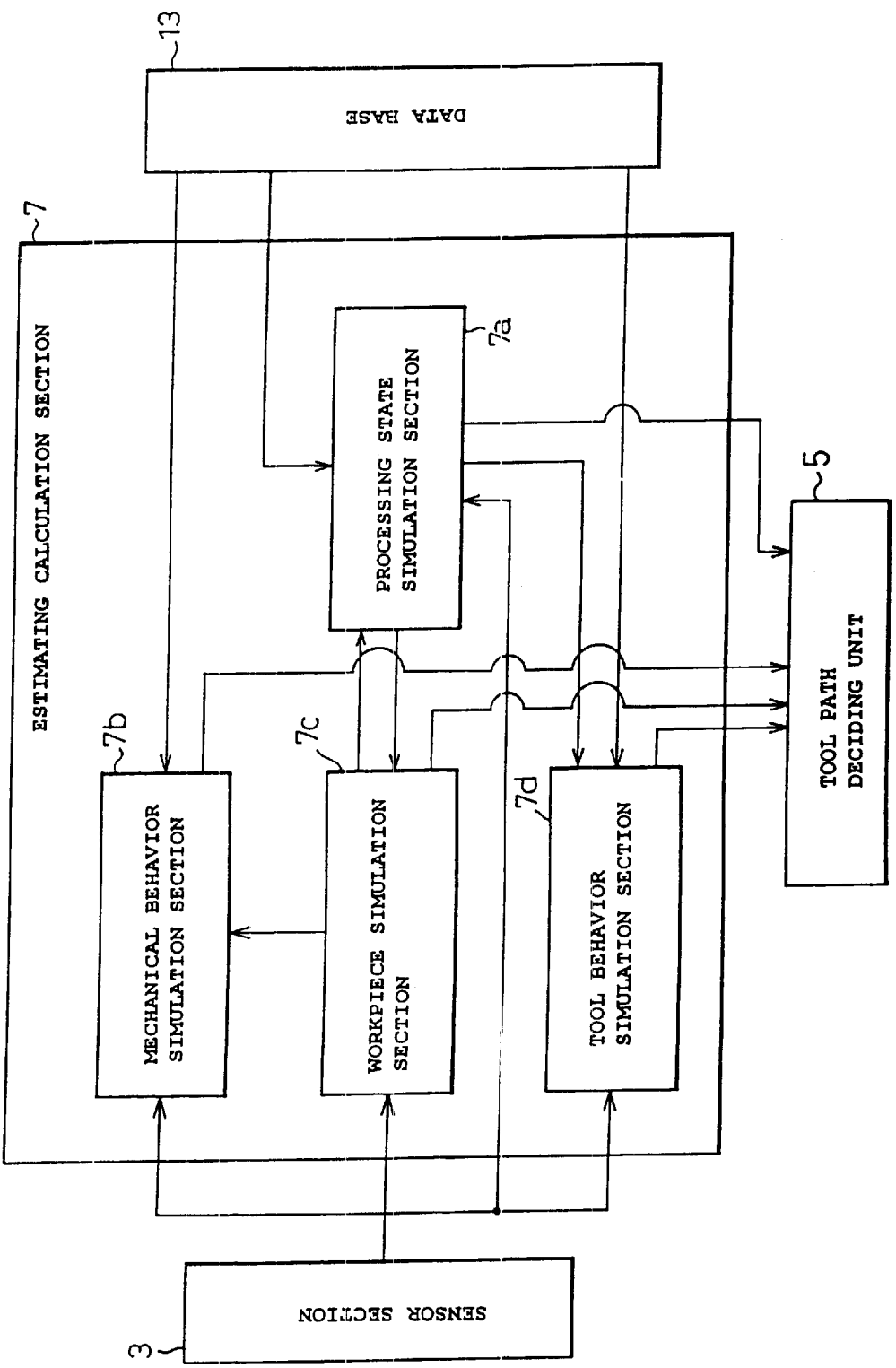

PRIOR ART

MACHINING APPARATUS

FIELD OF THE INVENTION

The present invention relates to a control device for controlling a machine tool capable of processing a workpiece according to the data of a profile of a final product when the workpiece is set in the machine tool and the data of the profile is inputted into the control device to operate the machine tool. The data of a profile of a final product is referred to as processing profile data in this specification, hereinafter. The present invention also relates to a processing device into which the control device and the machine tool are incorporated.

DESCRIPTION OF THE PRIOR ART

Conventionally, when a workpiece is processed by a numerically controlled machine tool for manufacturing a product, first, a drawing, on which a profile of the product is drawn, is made. A programmer decides a manufacturing process from the drawing and makes a numerically controlling program manually or automatically by an automatic programming device. The operator inputs the numerically controlling program into the numerically controlled machine tool and sets a workpiece to be processed in the numerically controlled machine tool manually or automatically by an automatic workpiece exchanging device. Then, the operator presets a tool to be used and sets a quantity of offset of the tool. Then, the operator attaches the tool to be used to a tool magazine of the numerically controlled machine tool. After that, the numerically controlling program is carried out, so that the workpiece can be processed. In this way, the product can be manufactured. In order to automate the above process as much as possible and also in order to utilize know-how accumulated by the programmer and operator, various inventions have been made and these will be described below.

As the first prior art, Japanese Unexamined Patent Publication No. 4-315550 discloses an automatic programming device. This automatic programming device comprises: a profile recognizing means for extracting a processing profile from data which expresses the processing profile of a workpiece; a processing condition storing means for storing the most appropriate condition with respect to the processing profile of the workpiece; and an automatic processing condition setting means for automatically setting the most appropriate processing condition stored in the processing condition storing means according to an output of the profile recognizing means. Due to the foregoing, it is unnecessary for the operator to set the processing condition at the machine tool, that is, the processing condition can be automatically set. Therefore, it becomes possible to exclude an error caused by an operator. Further, the load imposed on the operator can be reduced, and furthermore the working time can be shortened.

As the second prior art, Japanese Unexamined Patent Publication No. 4-138504 discloses a processing system. In this processing system, data of the workpiece such as the material, the surface roughness and the dimensional accuracy is previously stored, and the processing condition is decided by the first neural network. This processing condition can be corrected by the operator. The processing system includes a learning means by which a corrected processing condition is found when the processing condition is corrected according to the result of processing after processing has been actually conducted, and this learning means corrects the weight of the first neural network. Further, this processing system includes sensors to detect sparks, sound and forces generated in the process of processing. This processing system includes an adaptability control means in which input data sent from the sensors is inputted into the second neural network as data in a time series, and a state of processing at a certain point in time is averaged over a predetermined time so that the processing condition can be dynamically corrected. Due to the foregoing, even an unskilled worker can conduct processing under the most appropriate processing condition.

As the third prior art, Japanese Unexamined Patent Publication No. 9-26811 discloses a processing method in which numerical control is utilized. This processing method is described as follows. According to the registration of various information files, the input of data of a processing profile, the processing of a finished figure, the recognition of a pattern and the decision of a processing process, the most appropriate processing process and machine tool are selected, and the processing region and the processing procedure of the highest production efficiency are set, and the tool, the processing condition and the tool path, which are most appropriate for the inputted figure, are determined, and the production efficiency is enhanced by the measurement and correction conducted after processing and at the same time the processing accuracy is enhanced.

The technique for automatically creating a tool path from the data of a profile of a product to be processed is well known. When various processing conditions are added to this, the numerically controlling program can be automatically made. In the invention of the first prior art, according to the profile data of a product to be processed, the processing data is selected from the data base by a predetermined algorithm. This is a so-called stationary processing condition. On the other hand, in the invention according to the second prior art, a processing state which changes every second is detected by the sensor, and the processing condition which has been set according to the result of detection is subjected to adaptable control by the learning function of the neural network, so that a dynamic processing condition is found according to the processing state which changes every second. The first and the second prior art place emphasis on the automatic decision of the processing condition.

The invention of the third prior art is described as follows. When an operator inputs data, the processing condition is automatically decided by the same technique as that of the first and the second prior art, and the tool and the tool path are automatically decided, and the measurement and the technique of correction after processing are combined with each other, so that an objective product can be processed in an unmanned condition.

However, the above prior arts are based on the technical concept that a high dimensional accuracy and production efficiency are ensured by a method in which the state of processing is fed back for correction. That is, the above prior arts are not based on the technical concept that the processing state is estimated and the tool path and the processing condition are decided according to the result of estimation so as to realize the high dimensional accuracy and production efficiency.

It is an object of the present invention to provide a control device of a machine tool capable of automatically processing an objective product with high dimensional accuracy and high production efficiency only when data of a profile of a product and data of a workpiece are inputted into the control device. Also, it is an object of the present invention to provide a processing apparatus into which the control device and the machine tool are incorporated.

It is another object of the present invention to provide a control device of a machine tool capable carrying out the processing of a workpiece at high speed with high accuracy when the processing state is estimated and the tool path and the processing condition are automatically decided so that they can be made to agree with the estimated processing state. Also, it is another object of the present invention to provide a processing apparatus into which the control device and the machine tool are incorporated.

It is still another object of the present invention to provide a control device of a machine tool in which an operator can change the tool path and the processing condition and operate the device manually. Also, it is still another object of the present invention to provide a processing apparatus into which the control device and the machine tool are incorporated.

It is still another object of the present invention to provide a control device of a machine tool by which an operator can be supported when he selects a processing condition while cost and profit are being taken into consideration. Also, it is still another object of the present invention to provide a processing apparatus into which the control device and the machine tool are incorporated.

DISCLOSURE OF THE INVENTION

The present invention provides a control device of a machine tool, for processing a workpiece when processing profile data is inputted into the control device, comprising: an input means for inputting the processing profile data of a profile of a final workpiece and for inputting the workpiece data of material and a profile of the workpiece to be processed; a data storing means for storing at least one of the mechanical data of the machine tool to process the workpiece and the tool data of the tool mounted on the machine tool; an estimating calculation means for estimating at least the occurrence of interference of a processing load with the workpiece or the occurrence of interference of the tool with the workpiece according to the data inputted by the input means and also according to the data stored in the data storing means; and a tool path deciding means for creating a tool path to process the workpiece and deciding a processing condition for processing the workpiece such as a main shaft rotating speed of the machine tool and a feed speed of the workpiece according to the data inputted by the input means, according to the data stored in the data storing means and according to the result of an estimating calculation conducted by the estimating calculation means.

Further, the present invention provides a control device of a machine tool for processing a workpiece when processing profile data is inputted into the control device, comprising: an input means for inputting the processing profile data of a profile of a final workpiece and for inputting the workpiece data of material and a profile of the workpiece to be processed; a data storing means for storing at least one of the mechanical data of the machine tool to process the workpiece and the tool data of the tool mounted on the machine tool; a tool path deciding means for creating a tool path to process the workpiece and deciding a processing condition for processing the workpiece such as a main shaft rotating speed of the machine tool and a feed speed of the workpiece according to the data inputted by the input means and the data stored in the data storing means; and an operator changing operation judging means for recognizing and storing a changing operation of the operator with respect to the tool path and processing condition which have been created and decided by the tool path deciding means and also for judging whether or not the changing operation is appropriate and also for reflecting the changing operation on the creation and decision of the tool path and the processing condition.

Furthermore, the present invention provides a control device of a machine tool for processing a workpiece when processing profile data is inputted into the control device, comprising: an input means for inputting the processing profile data of a profile of a final workpiece and for inputting the workpiece data of material and a profile of the workpiece to be processed; a data storing means for storing at least one of the mechanical data of the machine tool to process the workpiece and the tool data of the tool mounted on the machine tool; and a cost calculating means for calculating the processing cost of the workpiece according to the data inputted by the input means and the data stored in the data storing means.

BRIEF DESCRIPTION OF THE DRAWINGS

FIG. 13A is a perspective view of a curved surface to be processed.

FIG. 22A is a schematic illustration for explaining a method of deciding a protruding curved portion.

FIG. 28 is a block diagram of an estimating calculation unit.

FIG. 39A is a view showing a designed profile of a workpiece according to processing profile data.

THE MOST PREFERRED EMBODIMENT

Referring to the appended drawings, an embodiment of the present invention will be explained below.

Figure 1:
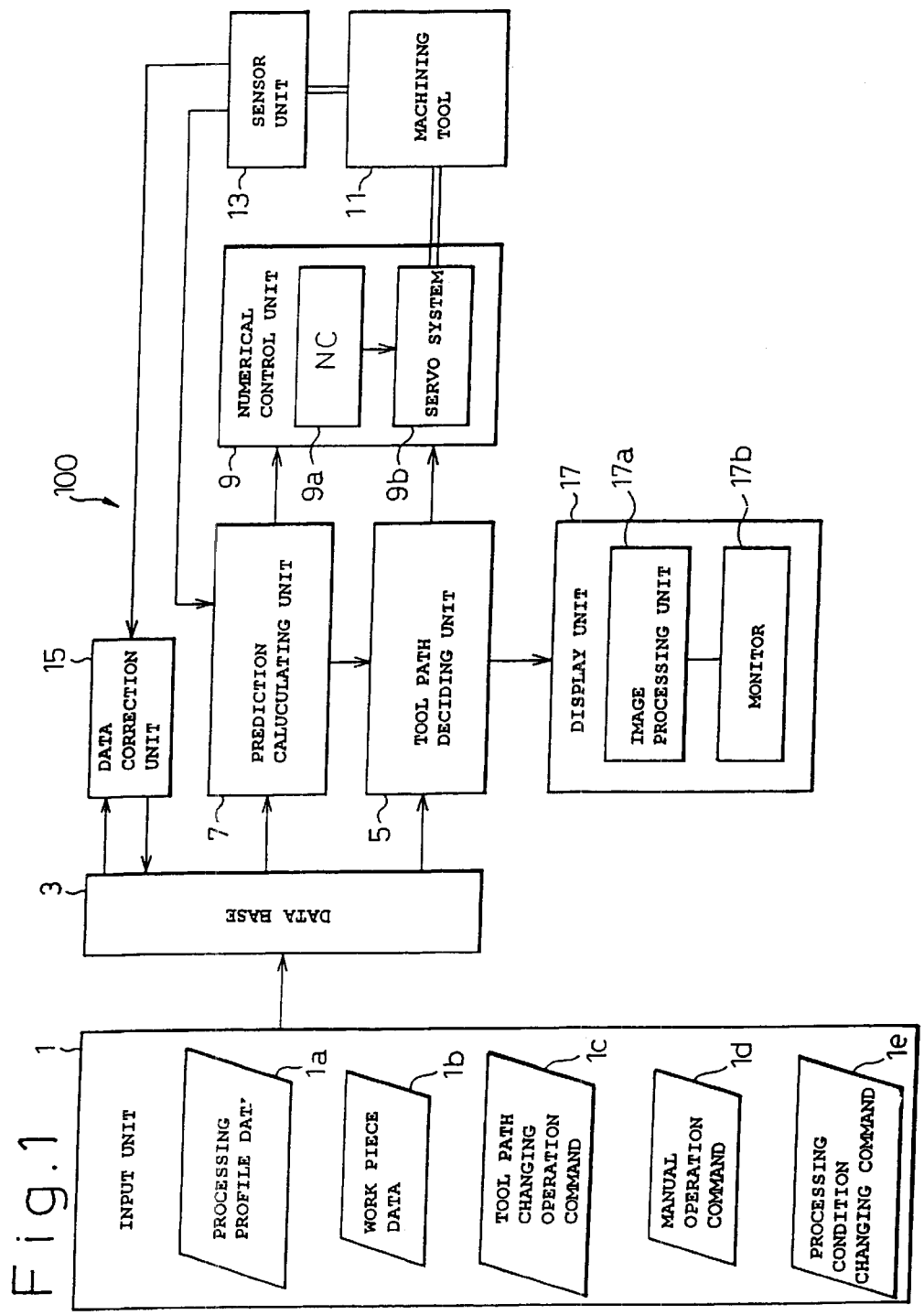
FIG. 1 is a block diagram of a control device of a machine tool of an embodiment of the present invention.

FIG. 1 is a block diagram of a control device 100 of a machine tool of an embodiment of the present invention. The control device 100 includes an input unit 1, data base 3, tool path deciding unit 5 and estimating calculation unit 7. Although the details are not shown in the drawing, the control device 100 may include CPU, RAM, ROM, input and output interface, data storing device, and bi-directional bus for connecting them with each other.

The input unit 1 is a device for inputting data and commands necessary for the control device 100. The input unit 1 can be composed of not only a keyboard but also an information medium such as a floppy disk or optical disk and a drive unit for driving the information medium. Further, the input unit 1 can be composed of a network computer for storing various data and sending commands and an interface for the network computer.

It is possible for an operator to input data and commands such as processing profile data 1a, work data 1b, tool path changing operation command 1c, manual operation command 1d and processing condition changing operation command 1e from the input unit 1. The processing profile data 1a is data which represents a profile of an objective product, for example, the processing profile data 1a may be a piece of electronic information of a figure such as CAD data. The processing profile data 1a may include data of dimensional accuracy and surface roughness. The work data 1b is data which represents a profile and material of a workpiece to be processed. The work data 1b may include data of a size and profile of a jig such as an attachment or pallet which is used for mounting the workpiece on the machine tool 11. Also, the work data 1b may include data of a position at which the workpiece is attached to a jig in the machine tool 11.

The tool path changing command 1c is a command by which an operator changes a tool path, which has been automatically created by the control device 100, while the workpiece is being processed. The manual operation command 1d is a command for processing the workpiece by manual operation of the operator while the workpiece is being processed. The processing condition changing operation command 1e is a command for changing the processing condition, which has been automatically created by the control device 100, by the operator. The tool path changing operation command 1c, manual operation command 1d and processing condition changing operation command 1e will be described in detail later.

Data inputted from the input unit 1 is stored in the data base 3 which is a data storing means. The data base 3 includes a mechanical data base 3a, tool/holder data base 3b, processing condition data base 3c, material data base 3d, NC/servo data base 3e, input data base 3f, and user data base 3g. The data base 3 may be composed of a data storage such as a hard disk device or optical disk device. Each of the mechanical data base 3a, tool/holder data base 3b, processing condition data base 3c, material data base 3d, NC/servo data base 3e, input data base 3f and user data base 3g, which are incorporated into the data base 3, may be composed of an individual data storage. Alternatively, each of them may be composed in such a manner that one data storage is partitioned into a plurality of regions and the thus partitioned regions are respectively made to be data bases 3a to 3g.

Figure 2:
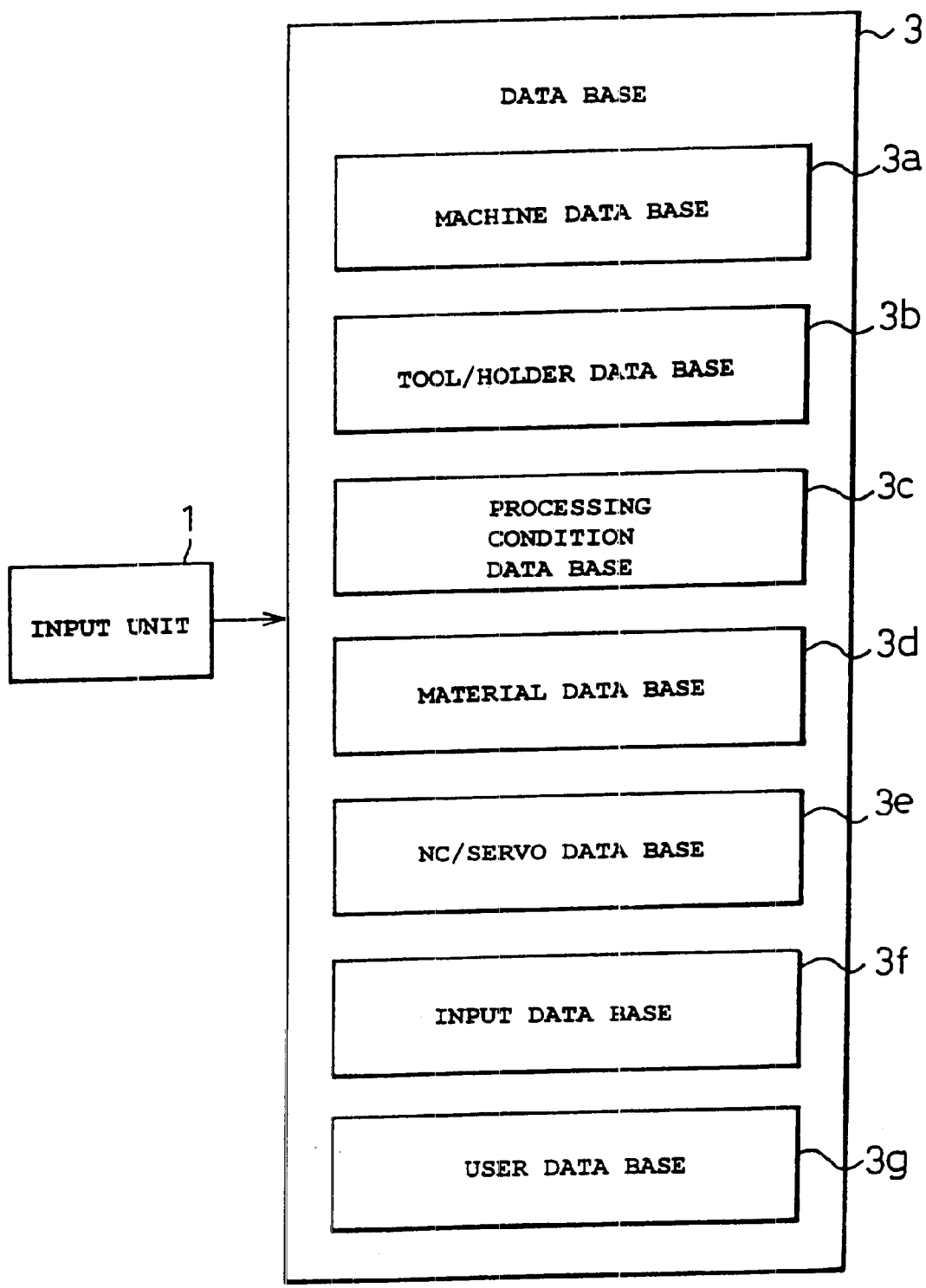
FIG. 2 is a block diagram of a data base.

Referring to FIG. 2, data stored in the mechanical data base 3a includes a stroke of each feed rod of the machine tool 11, maximum rotating speed of the main shaft, maximum feed speed, data of the deformation characteristic of the machine with respect to temperature, and data of the deformation characteristic of the machine with respect to the weight of the workpiece. Data stored in the tool/holder data base 3b includes a control number of the tool, sizes and profiles of the tool and tool holder, material of the tool, life of the tool, data of tilting characteristic of the tool with respect to a load, data with respect to deviation, and size and profile of the end portion of the main shaft. Data stored in the processing condition data base 3c includes a quantity of feed per one blade, a quantity of cutting, a quantity of pick-feed, the use of coolant, a processing pattern, region classification data for classifying a processing face into a plurality of processing regions, and basic data for selecting the most appropriate tool for processing a surface to be processed. Data stored in the material data base 3d includes a type of material, hardness, tensile strength and elastic coefficient of the material. Data stored in the NC/servo data base 3e includes items of a numerically controlled device, setting parameters, the time constant of the servo and the gain. The input data base 3f includes the processing profile data 1a and the work data 1b, which are inputted from the input unit 1, and the data of the tool path changing operation command 1c, the manual operation command 1d and the processing condition changing operation command 1e. The user data base 3g accumulates and stores the data of the processing condition which was changed by an operator or user in the past.

In this case, the data stored in the data base 3 may be one of the data inputted by an operator, the data which has already been registered in the machine tool 11 and the data which has previously been stored in a predetermined storage means.

Figure 3:
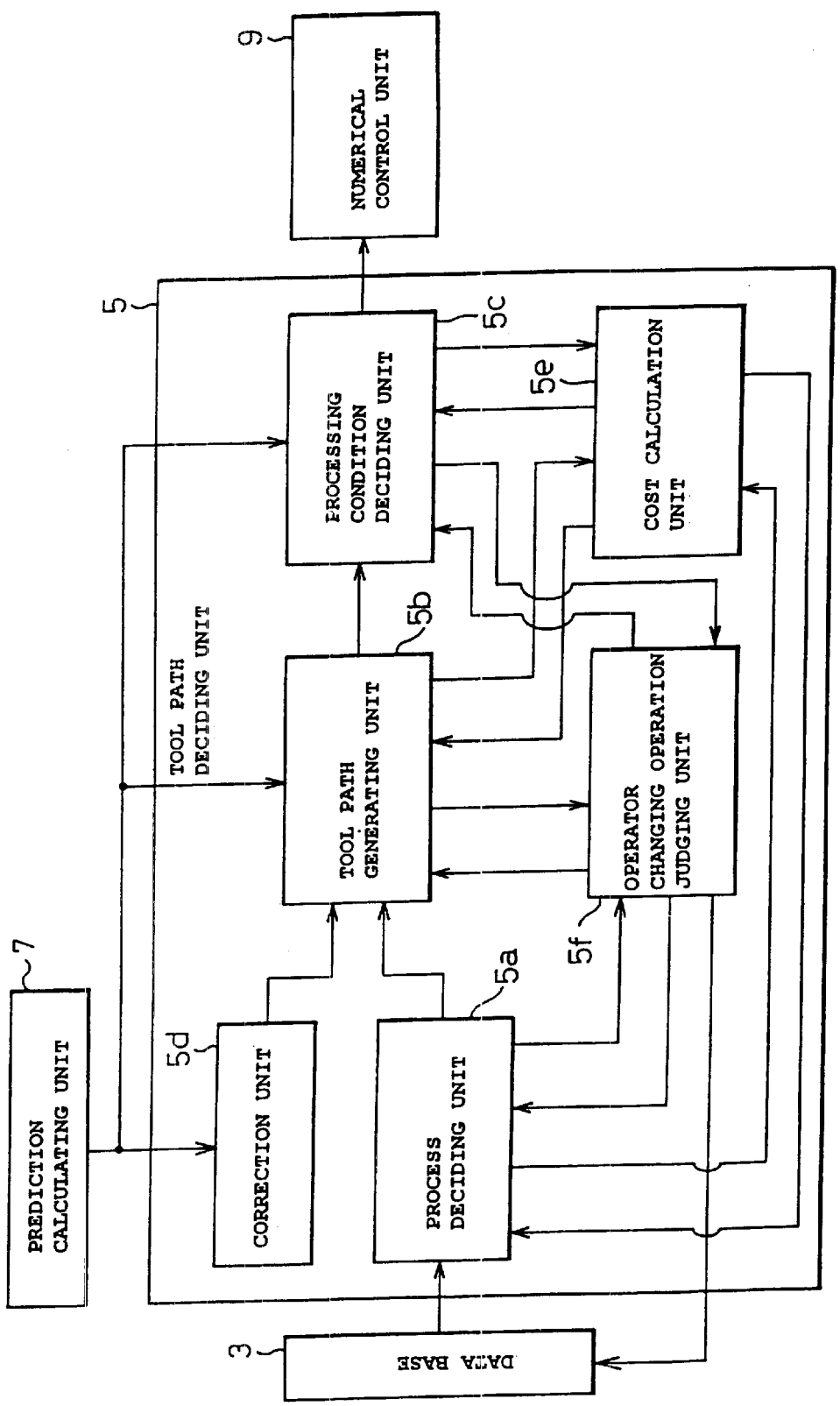
FIG. 3 is a block diagram of a tool path deciding unit.
Figure 4:
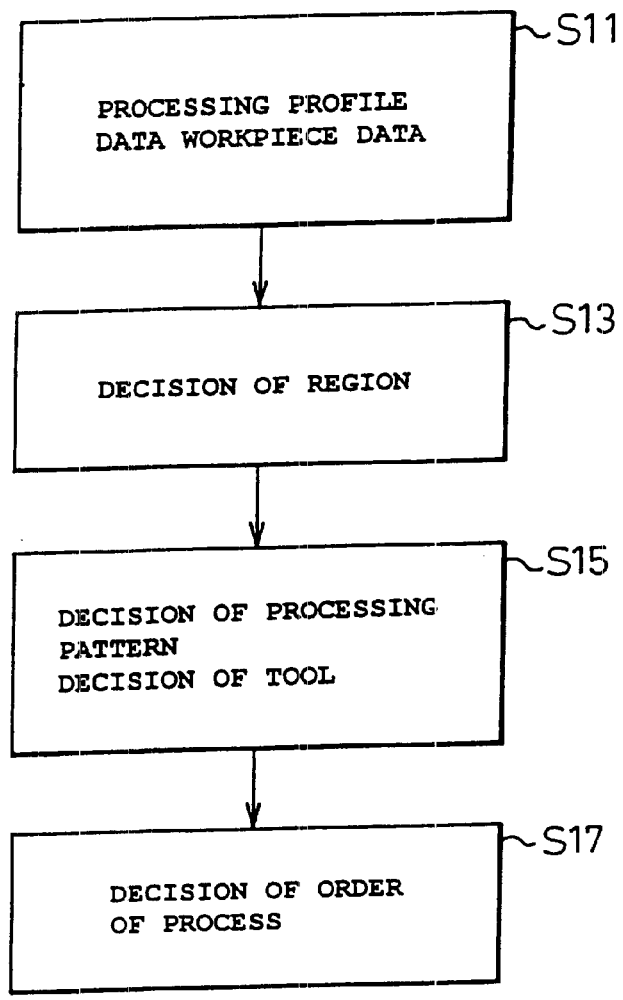
FIG. 4 is a flow chart of a processing process deciding unit.

Referring to FIGS. 3 and 4, the tool path deciding unit 5 will be explained below.

The tool path deciding unit 5 includes a processing process deciding unit 5a, tool path creating unit 5b, processing condition deciding unit 5c and correcting unit 5d, the detail of which will be explained later.

First, the processing profile data 1a and the work data 1b, which are stored in the input data base 3f, are sent to the processing process deciding unit 5a (step S11). According to the above data, the processing process deciding unit 5a recognizes the profiles of the processing surfaces of a workpiece to be processed and a workpiece to be finally made. Next, the processing process deciding unit 5a divides the processing surface into a plurality of processing regions according to the profile of the processing surface, which has been recognized to be region dividing data, stored in the processing condition data base 3c while the radius of curvature of the processing surface, the tilt angle and the depth are used as surface parameters (step S13). Next, corresponding to each surface parameter of the processing region, the processing process deciding unit 5a selects the most appropriate tool and processing pattern for processing the processing region from the basic data and the processing pattern for selecting the most appropriate tool for processing stored in the processing condition data base 3c (step S15). For example, when a steeply inclined face is processed by scan-pass, the tool is given an overload or abnormal vibration is caused in the process of cutting. In order to prevent the occurrence of the above problems, the contour processing pass is selected when a steeply inclined face is processed. At this time, the data concerning whether or not coolant is supplied is introduced from the processing condition data base 3c. Next, the order of processing by which each processing region is processed is decided (step S17).

Figure 5:
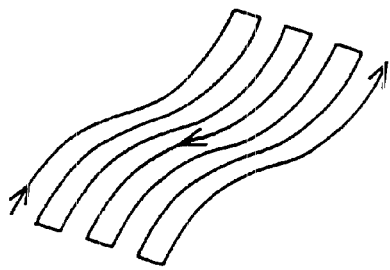
FIG. 5 is a schematic illustration showing a scanning processing pass which is an example of the processing pattern.
Figure 6:
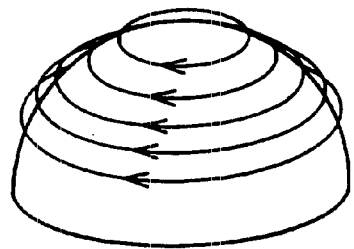
FIG. 6 is a schematic illustration showing a contour profile processing pass which is an example of the processing pattern.
Figure 7:
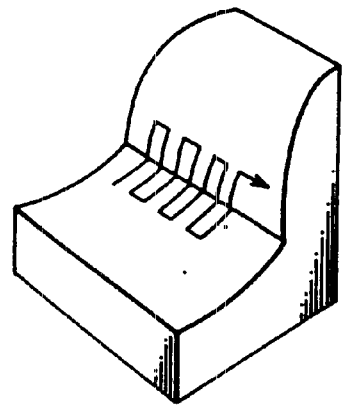
FIG. 7 is a schematic illustration showing a character line processing pass which is an example of the processing pattern.
Figure 8:
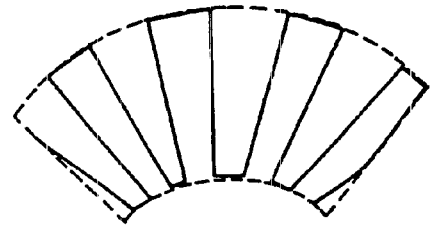
FIG. 8 is a schematic illustration showing a radial processing pass which is an example of the processing pattern.

FIGS. 5 to 12 are views showing examples of the processing patterns. FIG. 5 is a view showing a scan processing pass, and FIG. 6 is a view showing a contour profile processing pass. FIG. 7 is a view showing a scan processing pass in which only a portion having a workpiece in it is decided to be a processing region so that the cutting efficiency can be enhanced, that is, FIG. 7 is a view showing a character line processing pass. FIG. 8 is a radial processing pass in which point O is located at the center.

Figure 9:
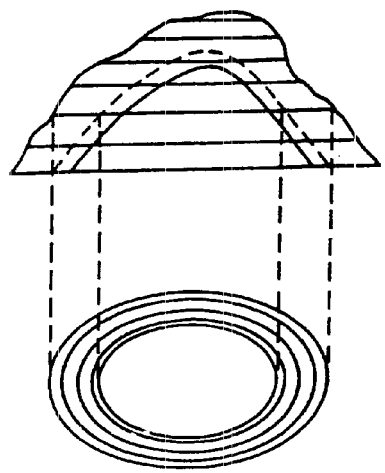
FIG. 9 is a schematic illustration showing a state of rough cutting by a contour profile processing pass which is an example of the processing pattern.
Figure 10:
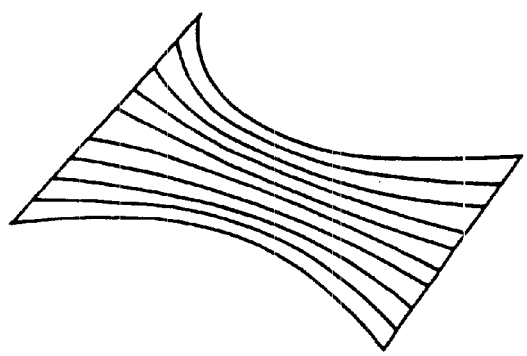
FIG. 10 is a schematic illustration showing a scanning processing pass different from that shown in FIG. 5 which is an example of the processing pattern.
Figure 11:
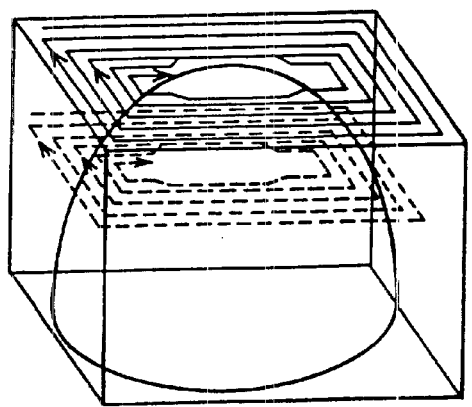
FIG. 11 is a schematic illustration showing a contour profile processing pass which is an example of the processing pattern.

FIG. 9 is a view showing a contour profile processing pass in which a workpiece such as an article of cast metal, from which a predetermined quantity of material is removed by processing, is processed to remove a predetermined quantity of material, that is, the profile is reduced in the direction of a normal line by a predetermined quantity of material, for example, the workpiece is repeatedly reduced by offsetting. FIG. 10 is a view showing a scan processing pass in which a workpiece such as an article of cast metal, from which a predetermined quantity of material is removed by processing, is processed by a predetermined quantity of material. FIG. 11 is a view showing a contour processing pass by which the cutting efficiency can be enhanced in such a manner that only a portion in which a workpiece exists is made to be a processing region, for example, processing is started from a portion in which a workpiece exists, and a quantity of pick-feed is decreased when the profile of a workpiece becomes similar to the profile to be processed.

Figure 12:
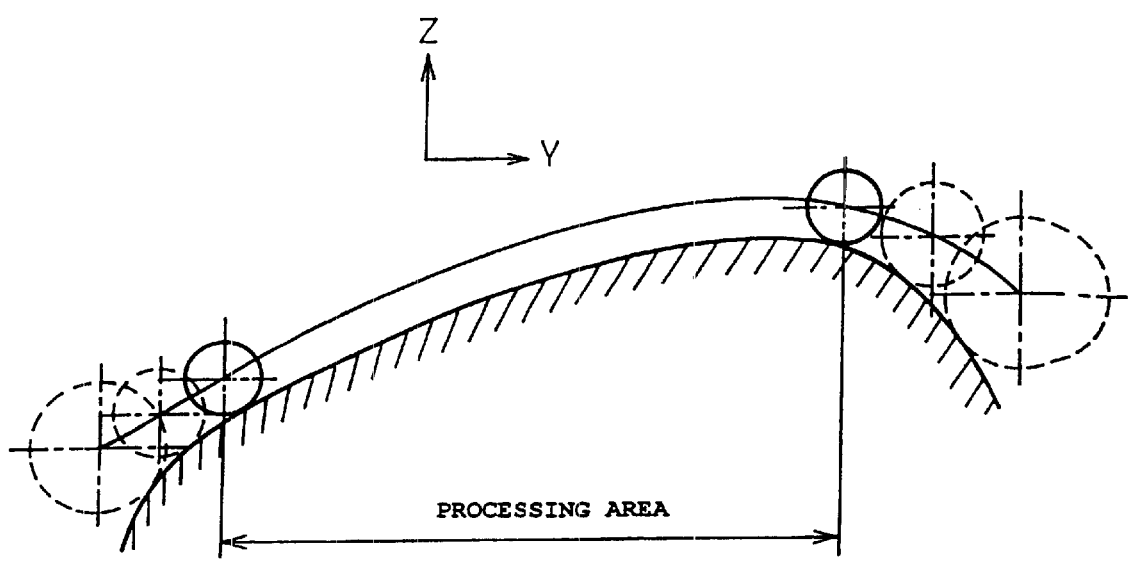
FIG. 12 is a schematic illustration showing a processing pass by which a difference in level in a boundary unit can be prevented when the boundary unit of a processed region is automatically overlapped by an adjacent processed region so that a tool can be smoothly retracted in the overlapping portion, which is an example of the processing pattern.

FIG. 12 is a view showing a processing pass in which a boundary unit of a processing region is automatically overlapped by an adjacent processing region and the tool is smoothly retracted in this overlapping region so that a difference in level can be prevented in the boundary unit. That is, FIG. 12 is a view showing a processing pass in which a tool is directed from a retracted position, which is distant by a predetermined distance from the processing region, to the processing region, and the processing region is processed in such a manner that the movement of the tool is started from a position, which is distant by a predetermined distance from the tool path of the tool of a predetermined tool diameter in the direction of a normal line, and the tool is moved so that the movement of the tool can agree with the tool path of the predetermined tool diameter in the processing region. These processing patterns are stored in the data base 3 so that the processing patterns can be selected corresponding to the radius of curvature of the processing region, the tilt angle and the depth while the accumulated know-how is reflected on the selection. The processing patterns shown in the drawings are examples. Therefore, it should be noted that the present invention is not limited to the specific examples.

Figure 13A:
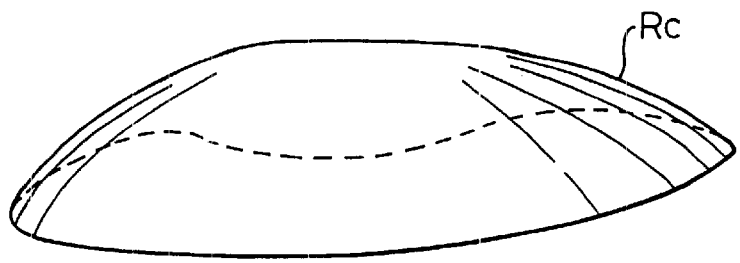
FIG. 13A is a schematic illustration for explaining a method of deciding a longitudinal direction of a curved surface of a workpiece to be processed, that is.

Next, referring to FIGS. 13A to 15, explanations will be made of an automatic decision method of deciding a cutting direction in the processing process deciding unit 5a. In FIG. 13A, there is shown a curved surface Rc of the workpiece. As an example, when the curved surface Rc of the workpiece shown in FIG. 13A is processed by scan-pass, the longitudinal direction of the curved surface Rc is decided, and the tool is fed in a direction parallel to this longitudinal direction of the curved surface Rc. Due to the foregoing, the number of motions of pick-feed can be reduced to as little as possible. When the number of motions of pick-feed is reduced, the moving and the stop time of the tool can be shortened in the process of pick-feed. Therefore, the processing time can be shortened.

Figure 13B:
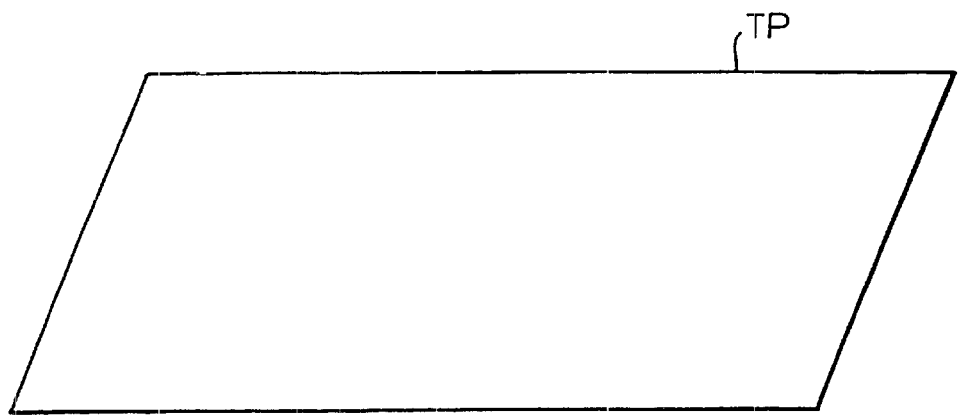
FIG. 13B is a view showing a plane onto which the curved surface shown in FIG. 13A is projected.
Figure 14:
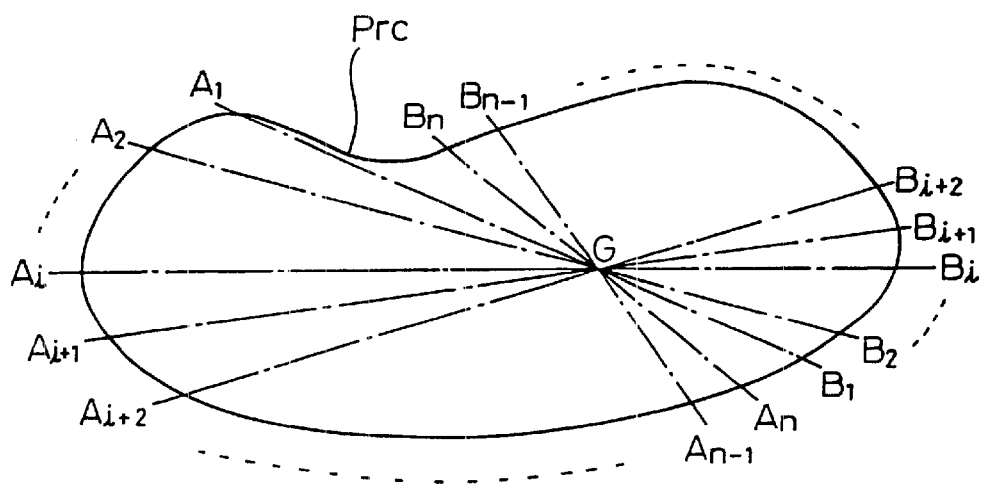
FIG. 14 is a schematic illustration for explaining a method of deciding a longitudinal direction of a curved surface of a workpiece to be processed.
Figure 15:
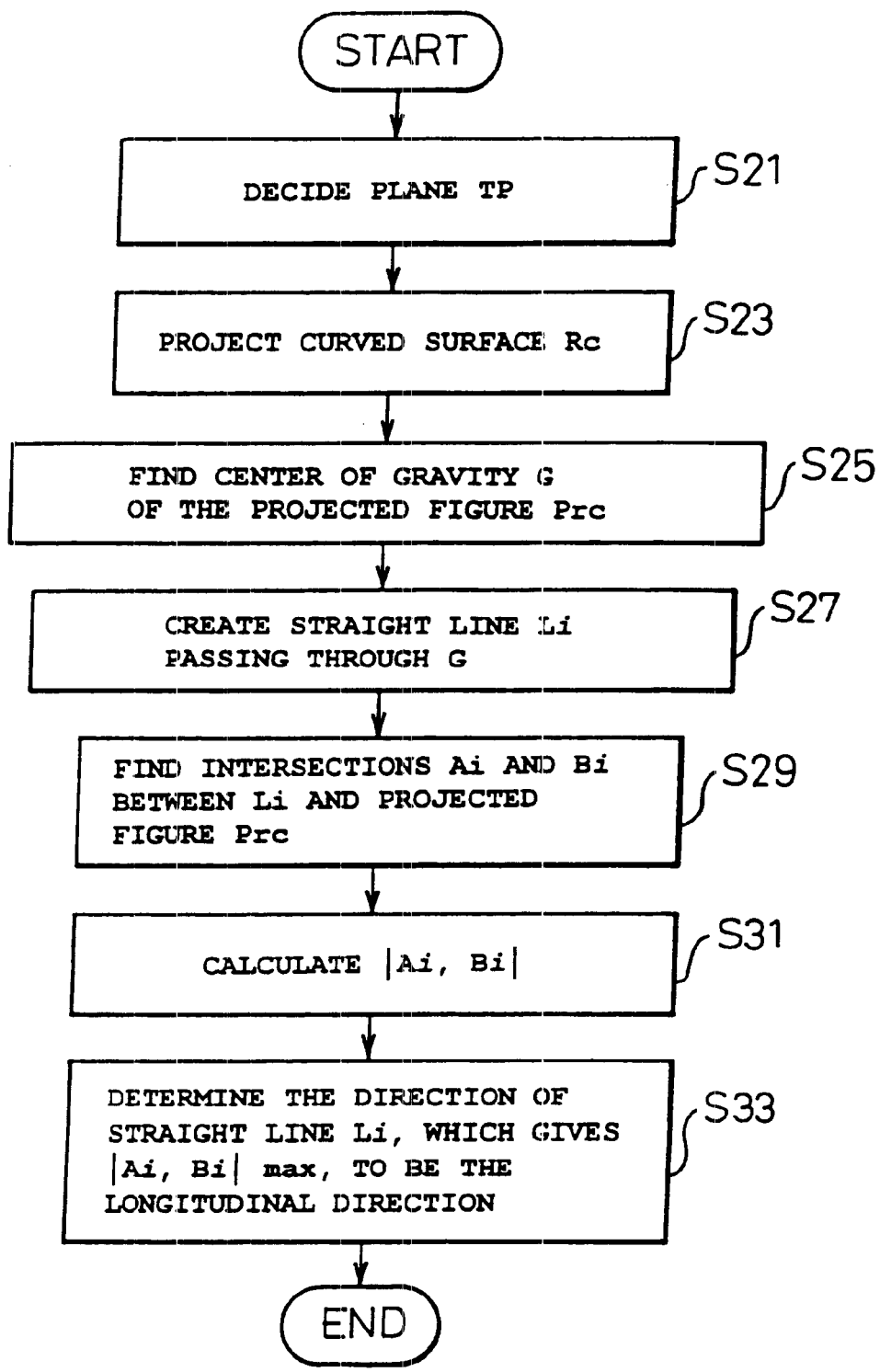
FIG. 15 is a flow chart showing a method of deciding a longitudinal direction of a curved surface of a workpiece.

First, plane TP, which gives the maximum projection area of the curved surface Rc of the workpiece, as shown in FIG. 13B (step S21), is decided. Next, the curved surface Rc of the workpiece is projected onto plane TP (step S23). FIG. 14 is a view showing a figure obtained when the curved surface Rc of the workpiece is projected onto plane TP. Next, the center of gravity G of the projected figure Prc is found (step 25). This can be necessarily decided when figure Prc is decided. Then, straight lines Li (i=1 to n) passing through the center of gravity G are generated (step 27). Concerning the generation of straight lines Li, straight lines Li may be arbitrarily generated with respect to i which is sufficiently large. Alternatively, straight lines Li may be generated at regular angular intervals round the center of gravity G.

Next, intersection points Ai, Bi between figure Prc and straight line Li are found (step S29), and then distance |Ai, Bi| between intersection points Ai and Bi is calculated (step S31). A direction of straight line Li in which this distance |Ai, Bi| becomes the maximum |Ai, Bi| max is decided to be the longitudinal direction (step S33). When the tool path is created in the tool path creating unit 5b described later, the direction of straight line Li decided in this way is determined to be the longitudinal direction and the tool is fed in this direction with respect to the workpiece. Due to the foregoing, the number of motions of pick-feed can be made a minimum, so that the processing time can be shortened.

Figure 16:
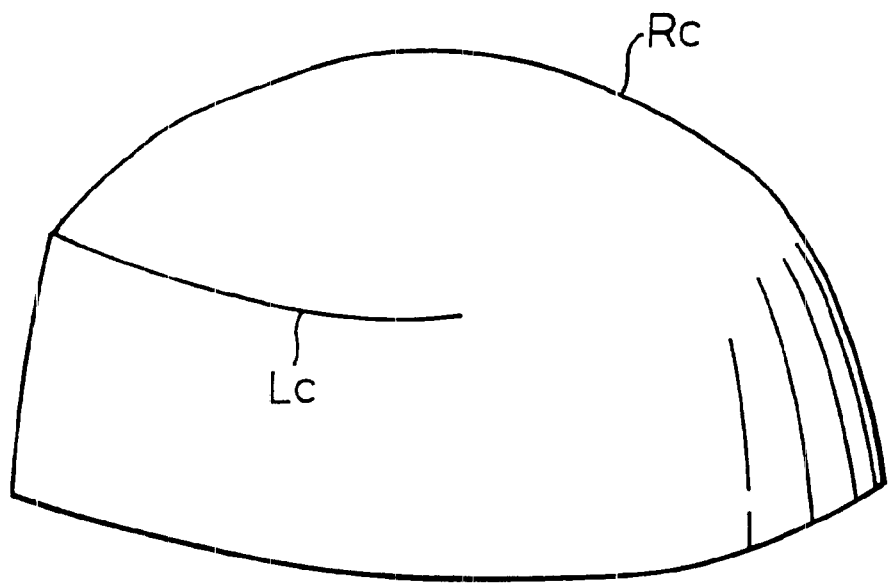
FIG. 16 is a schematic illustration for explaining a method of deciding a character line.
Figure 18:
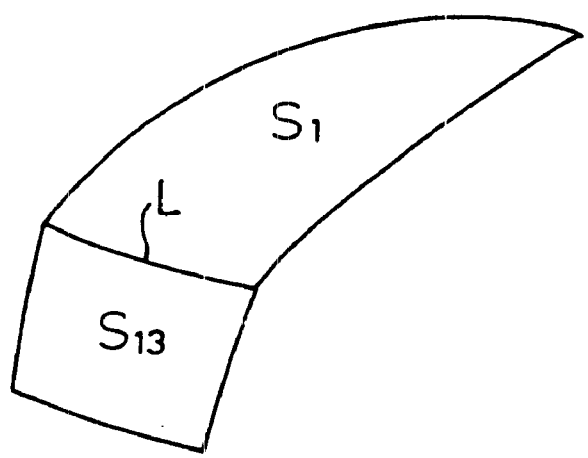
FIG. 18 is a schematic illustration for explaining a method of deciding a character line.
Figure 19:
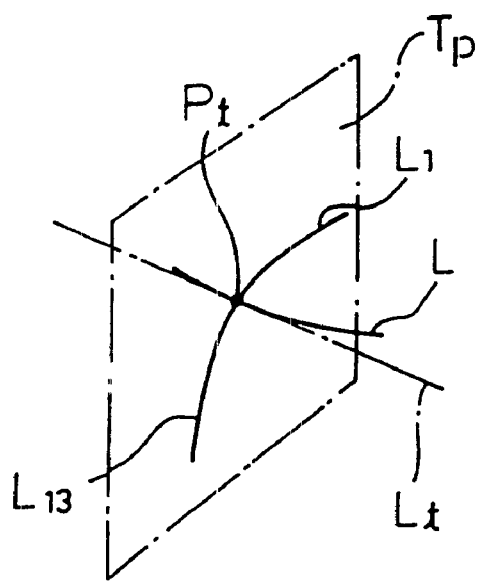
FIG. 19 is another schematic illustration for explaining a method of deciding a character line.
Figure 20:
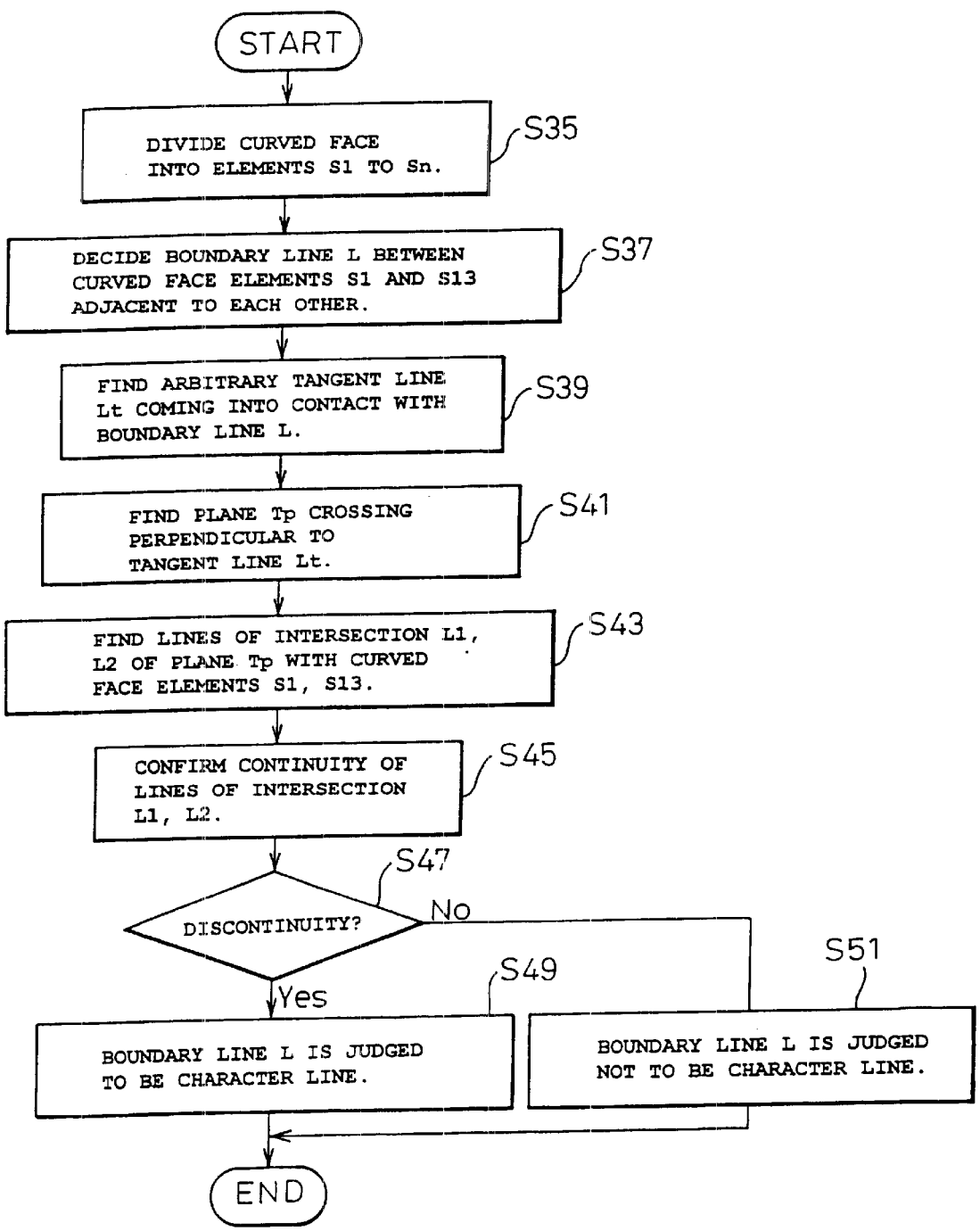
FIG. 20 is a flow chart showing a method of deciding a character line.

Next, referring to FIGS. 16 to 20, explanations will be made into a method by which the character line is processed with high accuracy by scan-pass as shown in FIG. 7. FIG. 16 is a perspective view of a curved surface of the workpiece having character line Lc. In this connection, in the following explanations, a case is explained in which a convex character line is processed as shown in FIG. 19. Of course, the circumstances are the same in a case where a concave character line is processed by scan-pass as shown in FIG. 7.

The character line is a straight line or curved line provided for giving an expression onto a curved surface. Therefore, the character line stands out compared with other curved surface regions. Therefore, it is necessary to conduct processing on the character line region more accurately than other processing regions. For the above reasons, it is necessary to specify the character line and conduct processing on the character line region in a processing condition different from that of other regions.

Figure 17:
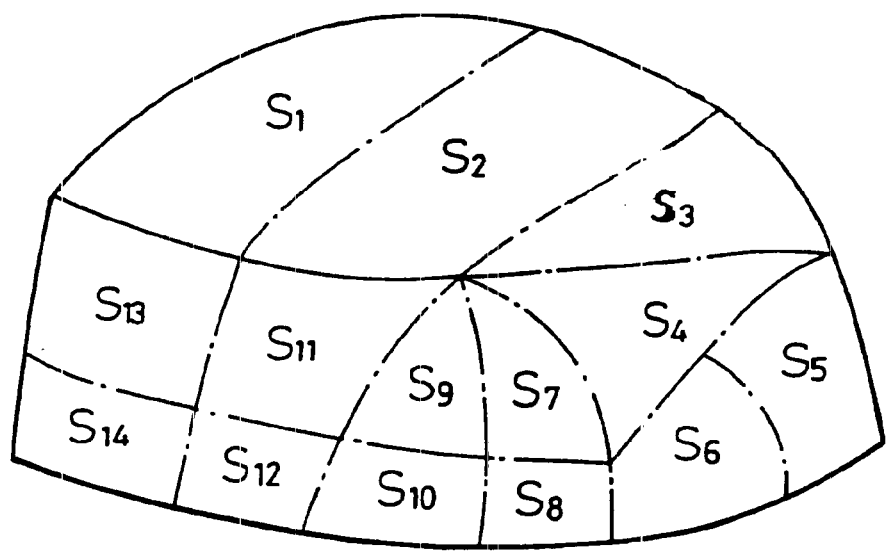
FIG. 17 is another schematic illustration for explaining a method of deciding a character line.

In order to extract character line Lc from curved surface Rc of a workpiece, first, as shown in FIG. 17, curved surface Rc of the workpiece is divided into a plurality of curved surface elements S1 to Sn in this embodiment, wherein the number n is set at n=14 (step S35). Areas of curved surface elements S1 to S14 are appropriately decided giving consideration to the radius of curvature of the curved surface element concerned. Next, boundary line L between the curved surface elements, which are adjacent to each other, is determined (step S37). In this embodiment, the curved surface elements, which are adjacent to each other, are the curved surface elements S1 and S13 as shown in FIG. 18.

Figure 21:
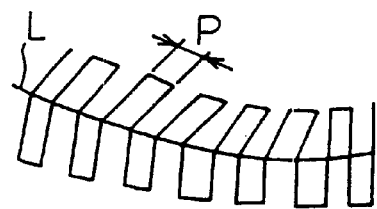
FIG. 21 is a schematic illustration showing a processing pass for processing a character line.

Further, tangential line Lt coming into contact with boundary line L is found (step S39). In this case, contact point Pt of boundary line L with tangential line Lt can be arbitrarily selected on boundary line L, for example, contact point Pt of boundary line L with tangential line Lt can be selected at the neutral point of boundary line L. Next, plane Tp crossing, perpendicular to tangential line Lt, at contact point Tt is found (step S41). Next, lines of intersection L1, L12 of plane Tp with two surface elements S1, S13 are found (step S43). Then, the continuity of the two lines of intersection L1, L13 is confirmed (step S45). As the method of confirming the continuity of the two lines of intersection L1, L13, it is possible to use a method in which the differential coefficients of the two lines of intersection L1, L13 agree with each other at contact point Pt. In the case where the lines of intersection L1, L13 are discontinuous to each other, that is, in the case where the result is Yes in step S47, boundary line L is judged to be a character line (step S49). In the case where the lines of intersection L1, L13 are continuous to each other, that is, in the case where the result is No in step S47, boundary line L is judged not to be a character line (step S51). As described above, after character line Lc has been extracted in the processing process deciding unit 5a, as shown in FIG. 21, a tool path which moves at a predetermined pick-feed P in the processing direction perpendicular to character line Lc is created in the tool path creating unit 5b. Due to the foregoing, it is possible to conduct cutting with high accuracy. In this case, it is possible to judge whether or not the two character lines are one character line by the inclination of the tangential line at the point of intersection of the two character lines which are adjacent to each other, and the processing process can be decided according to the judgment.

Figure 22A:
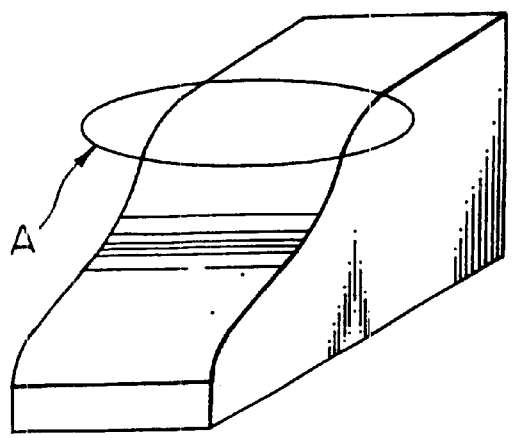
FIG. 22A is a perspective view showing an overall workpiece, that is.

There is a convex R unit of a metallic die used for pressing which is a processing region to be finished with high accuracy in the same manner as the character line. An example of the convex R unit is shown in FIG. 22A. The convex R unit, which is shown by reference character A in FIG. 22A, remarkably stands out when it is used for press forming in the case of a metallic die. Therefore, the convex R unit must be finished with high accuracy.

Figure 22B:
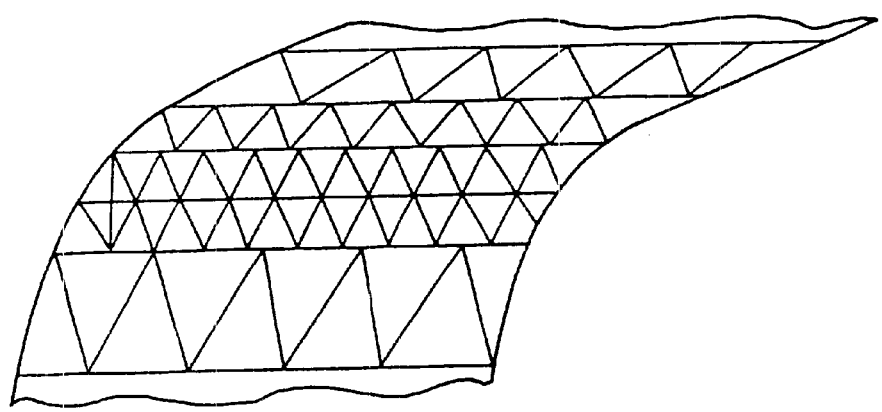
FIG. 22B is a partially enlarged view of FIG. 22A.

In order to judge the above region which must be finished with high accuracy, for example, the following method is adopted. The processing process deciding unit 5a divides the processing surface into minute triangular surface elements which are similar to each other by a predetermined allowance as shown in FIG. 22B. A region upon which the surface elements, the areas of which are smaller than a predetermined threshold value, concentrate, is extracted, and the thus extracted region is decided to be a steep profile changing region. It is judged whether this steep profile changing region is convex or concave. When this steep profile changing region is convex, this region is decided to be the convex R unit. When the tool path by which only the thus decided convex R unit is processed with high accuracy is created by the tool path creating unit 5b, it becomes possible to avoid the labor and time required for unnecessarily processing the overall workpiece with high accuracy.

Figure 23A:
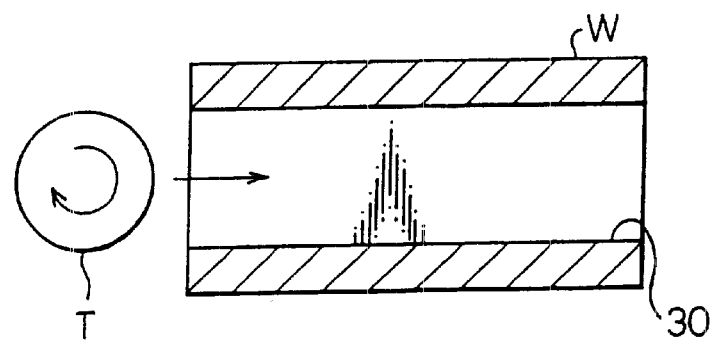
FIG. 23A is a view showing the processing of grooves according to the prior art.
Figure 23B:
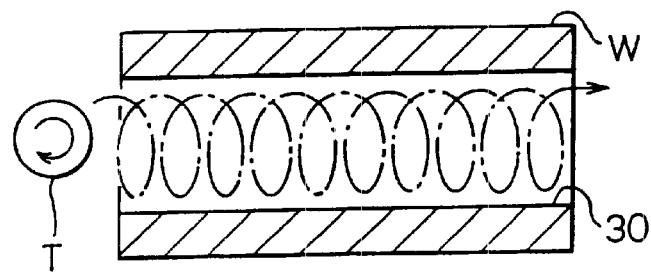
FIG. 23B is a view showing the processing of grooves by contouring of the present invention.

Next, referring to FIGS. 23A and 23B, explanations will be given of the groove processing by contouring which is an example of the processing pattern. As shown in FIG. 23A, when the processing of a groove is conducted with tool T, the diameter of which is the same as the width of the groove 30 which is processed in workpiece W, tool T is deflected at the entrance and exit of workpiece T and further the deflection of tool T is released. Therefore, the load given to tool T fluctuates greatly. As a result, flaws are caused in the bottom portion of the groove 30. On the other hand, as shown in FIG. 23B, when tool T, the diameter of which is smaller than the width of the groove 30, is used and a groove is formed in such a manner that a tool path for operating ellipse contouring is created by the tool path creating unit 5*b*, an intensity of the cutting load given to tool T is reduced, and the deflection of tool T is also reduced. Accordingly, the deflection of tool T at the entrance and exit of the workpiece can be released. Therefore, the load given to tool T does not fluctuate. In this way, tool T can be highly accurately fed at high speed with a light load. As a result, cutting can be conducted stably.

Data of the processing region, tool, processing pattern and processing order, which are decided by the processing process deciding unit 5*a* (not shown) in this way, are temporarily stored in the processing process storing means not shown in the drawing and then sent to the tool path creating unit 5*b*. Corresponding to the data of the processing region, tool and processing pattern and also corresponding to the work data 1*b* stored in the input data base 3*f* and especially corresponding to the data of material of the workpiece and the data of material, tensile strength and elastic coefficient stored in the material data base 3*d*, the tool path creating unit 5*b* decides the most appropriate values for processing the workpiece from a group of data of a quantity of feed per one blade, a quantity of cutting and a quantity of pick-feed stored in the processing condition data base 3*c*. At the same time, the tool path creating unit 5*b* creates a tool path and a pick-feed path.

The tool path and the pick-feed path are created by the calculation formula stored in the processing condition data base 3*c*.

Figure 24:
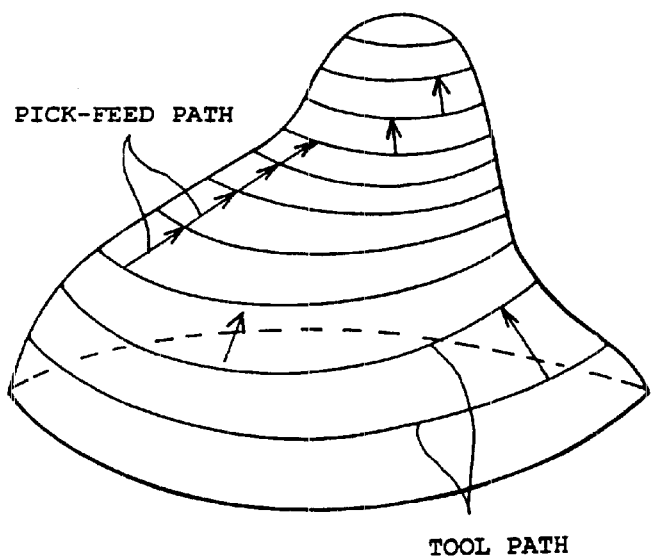
FIG. 24 is a schematic illustration for explaining a method of deciding a position at which pick-feed is conducted in a contour processing pass.
Figure 25:
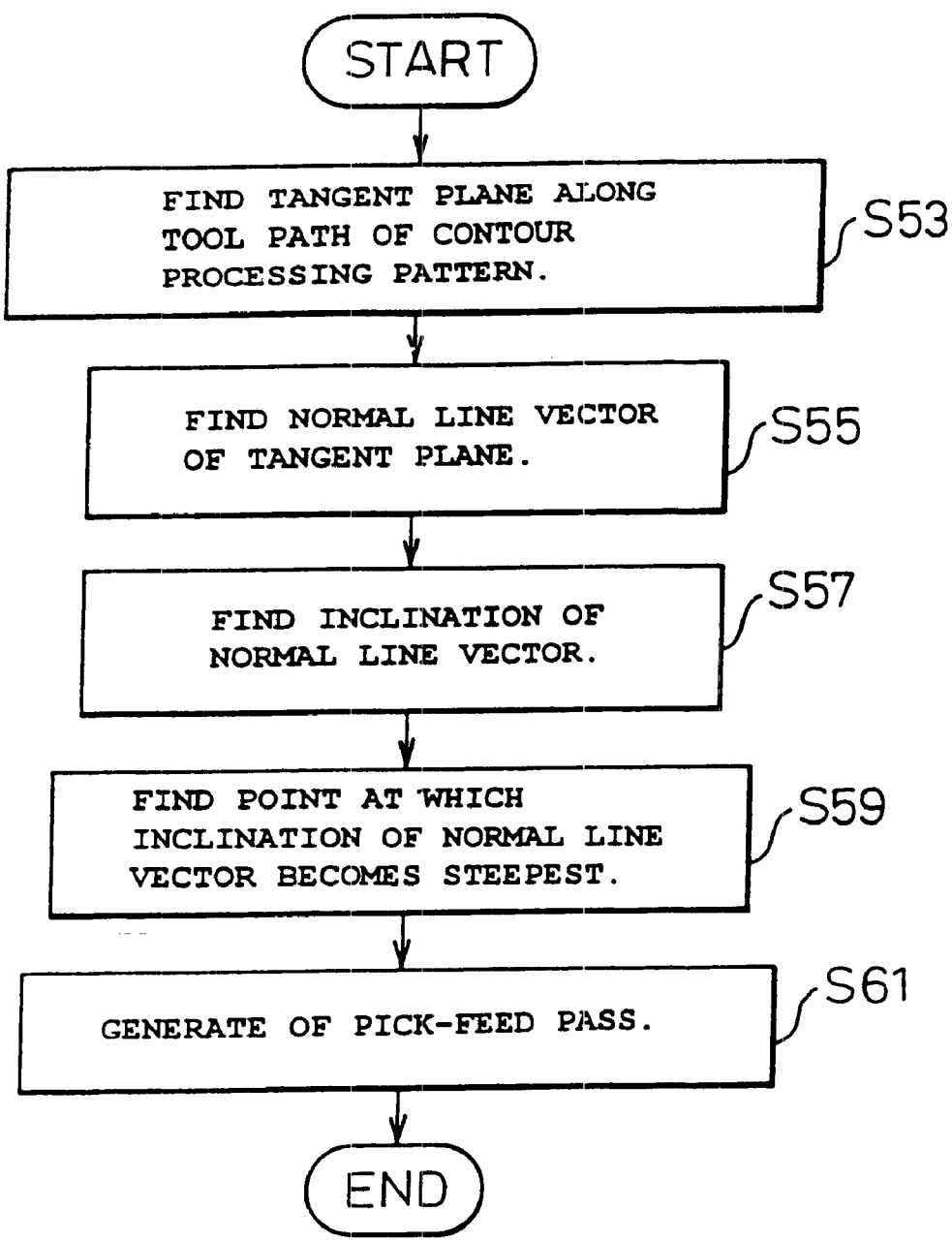
FIG. 25 is a flow chart for explaining a method of deciding a position at which pick-feed is conducted in a contour processing pass.

Referring to FIGS. 24 and 25, an example of deciding the direction of the pick-feed path will be explained below.

When a surface of a workpiece to be processed, the inclination angle in the circumferential direction of which changes as shown in FIG. 24, is subjected to cutting by a contour processing pattern and a quantity of pick-feed is set in the direction of a tangential line, if pick-feed is conducted on a steeply inclined surface, a clearance between the tool path and a portion in which the inclination angle is not so large is extended. As a result, some portions cannot be cut by the tool. Therefore, when pick-feed is conducted in a portion, the inclination angle of which is not large, as shown in FIG. 24, there is no possibility of generating portions in which cutting can not be conducted.

First, in the processing process deciding unit 5*a*, a plurality of tangent planes are determined along the tool path of the contour processing pattern (step S53), and the normal line vectors of the tangent planes are calculated (step S55). The tangent plane can be found as follows. A plurality of contact points are discretely determined at regular angular intervals in the circumferential direction along the tool path of the contour processing pattern, and the tangent plane with respect to the curved surface of the workpiece at the contact point is calculated. Next, an inclination of each normal line vector is found (step S57), and a contact point of the tangent plane having a normal line vector, the angle of which is the steepest, is found (step S59). Since the tangent plane, the inclination of the normal line vector of which is the steepest, is a surface, the inclination of which is the gentlest, the tool path creating unit 5*b* creates the pick-feed path so that pick-feed can be conducted from the contact point at which the normal line vector, the inclination of which is the steepest, is given (step S61). That is, a pick-feed path is created in which a quantity of movement in the direction of the tangent line becomes a quantity of pick-feed, which has been set, at the contact point concerned. In this connection, the direction of pick-feed is a tangential line direction perpendicular to a straight line coming into contact with the tool path at the contact point.

In this case, an operator may arbitrarily input or change the tool, processing pattern and processing process without selecting and deciding the tool, processing pattern and processing process in the processing process deciding unit 5*a* as described later. While one processing process is conducted, it is possible to conduct another processing process.

According to the result of calculation conducted in the tool path creating unit 5*b*, the processing condition deciding unit 5*c* decides a main shaft rotating speed and feed speed of the machine tool 11 from the quantity of feed per one blade, quantity of cutting and quantity of pick-feed. At the same time, the tool exchanging command for each processing process and the command of insertion of the measurement process conducted by the sensor unit 13 described later are created in the numerically controlling unit 9.

Figure 26:
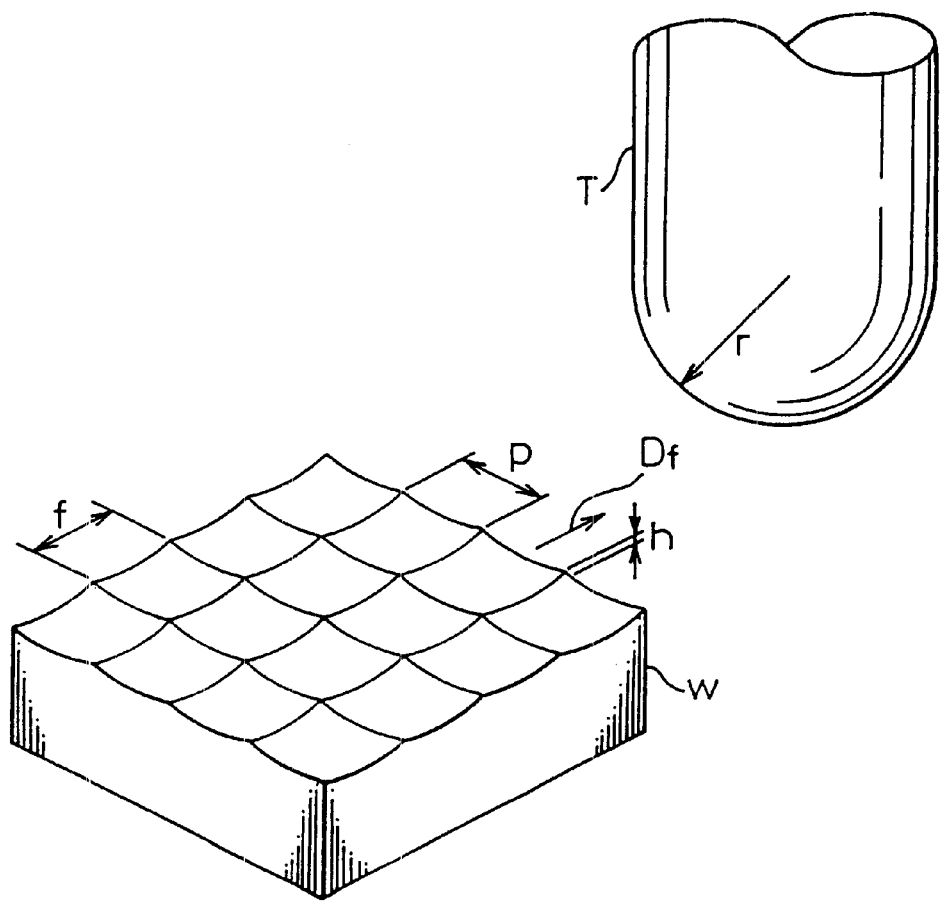
FIG. 26 is a schematic illustration for explaining a method of deciding a quantity of pick-feed and a feed speed in the case of processing a surface.
Figure 27:
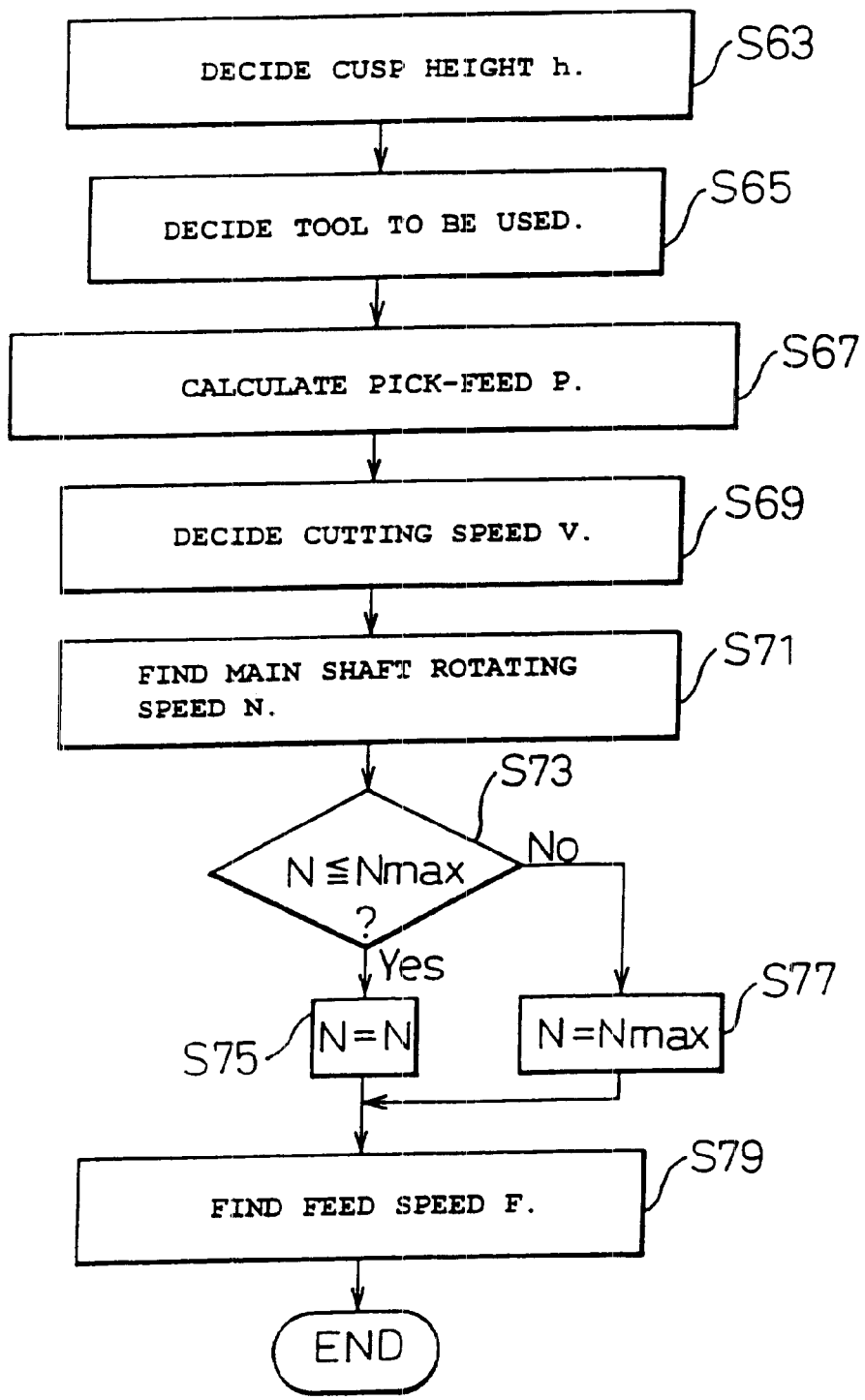
FIG. 27 is a flow chart of a method of deciding a quantity of pick-feed and a feed speed in the case of processing a surface.

Referring to FIGS. 26 and 27, explanations will be made into an example of deciding a quantity of pick-feed P and a feeding speed F which are the processing conditions to be decided by the processing condition deciding unit 5*c*. FIG. 26 is a perspective view showing a state in which cutting is conducted by scan-pass when ball end mill T is fed in the direction of arrow Df with respect to workpiece W.

First, cusp height h is decided from the finish accuracy contained in the processing profile data stored in the input data base 3*f* (step S63). Next, referring to the mechanical data base 3*a* and the tool/tool-holder data base 3*b*, a tool to be used is decided from the processing profile data and the work data (step S65). When the tool to be used is decided, the radius r of the tool and the number n of the blades are automatically decided. A quantity of pick-feed P is calculated from the cusp height h and the tool radius r, which have been decided in the above manner, by the following formula (step S67).

$$P=\sqrt{(8rh)}$$

Next, referring to the tool/tool-holder data base 3*b* and the processing condition data base 3*c*, cutting speed V is determined from the material of the workpiece included in the workpiece data (step S69), and a main shaft rotating speed N (rpm) is found from a quantity of pick-feed P and cutting speed V (step S71). In this case, it is determined whether or not the thus found main shaft rotating speed N exceeds the maximum main shaft rotating speed Nmax (step S73). In the case where main shaft rotating speed N does not exceed the maximum main shaft rotating speed Nmax (Yes in step S73), cutting is conducted by main shaft rotating speed N found in step S71 (step S75). In the case where main shaft rotating speed N exceeds the maximum main shaft rotating speed Nmax of the machine tool (No in step S73), cutting is conducted at main shaft rotating speed N which is equal to maximum main shaft rotating speed Nmax (step S77). Next, feed speed F is found by the following formula from the thus found number of blades n, the quantity of feed f per one blade of the tool which has been set to be equal to the quantity of pick-feed P and main shaft rotating speed N (step S97).

$$F=nfN$$

Due to the foregoing, the quantity of feed f per one blade of the tool becomes the same as the quantity of pick-feed P. Therefore, wave-like streaks formed on the surface of workpiece W can be uniformly distributed as shown in FIG. 26, that is, the processing surface becomes uniform. Due to the foregoing, when a metallic die is made, no specific orientation is caused in the polishing work conducted in the later process, so that polishing can be carried out according to the profile of the workpiece. Accordingly, the polishing time can be shortened.

In this case, it is possible to utilize the processing condition, which has been arbitrarily inputted by an operator, without deciding the processing condition in the processing condition deciding unit 5c, and also it is possible to utilize the processing condition, which has been previously stored in a predetermined storage means, without deciding the processing condition in the processing condition deciding unit 5c.

The correcting unit 5d gives a correction command to the tool path creating unit 5b or the processing process deciding unit 5a according to the result of estimating calculation sent from the estimating calculation unit 7 described later.

The numerically controlled unit 9 includes a numerically controlled device 9a which is commonly known, and a servo system 9b into which a servo motor and amplifier are incorporated. The numerically controlled unit 9 controls the feeding of the shaft of the machine tool 11 and the rotation of the main shaft. As is well known, the numerically controlled device 9a creates the commands of moving the feeding shafts of X, Y and Z according to the tool path data and the processing condition data. Further, the numerically controlled device 9a gives the operation commands of start and stop of the main shaft of the machine tool 11, ON/OFF of coolant, replacement of the automatic tool and replacement of the automatic pallet. The servo system 9b receives a movement command from the numerically controlled device 9a and controls the servo motor of the feed shaft. In this way, the machine tool 11 is controlled by the numerically controlled unit 9.

The machine tool 11 is a common machine tool such as a machining center provided with an automatic tool replacing device. The machine tool 11 has a sensor unit 13 including: temperature sensors such as thermistors for measuring the temperatures of the column and bed and other portions of the machine tool 11 and also for measuring the temperature of coolant and the temperature of the environment in which the machine tool 11 is installed; mechanical sensors including an ammeter for measuring an electric current supplied to the motor of the machine tool 11; tool sensors for measuring the length, diameter and shape of the tool attached to the machine tool 11; and work sensors for actually measuring the profile of the workpiece which is being processed. Values measured by the sensor unit 13 are sent to the estimating calculation unit 7 described later. Further, the tool diameter, tool length, deviation of the tool during rotation and fluctuation of the center, which have been measured by the tool sensors provided in the sensor unit 13, are sent to the tool/holder data base 3b of the data base 3 via the data correcting unit 15, so that the contents of the data base 3 can be corrected and renewed, especially the characteristic of abrasion of the tool, the life of the tool and the characteristic of deviation of the tool can be corrected and renewed.

The temperature of each portion of the machine measured by the temperature sensor of the mechanical sensor of the sensor unit 13, the temperature of coolant and the temperature of the environment are sent to the mechanical data base 3a of the data base 3 via the data correcting unit 15, so that the portion of the data base 3a concerned can be corrected and renewed. Further, the positioning error in the case of operation of the machine tool 11 may be calculated from the processing error measured by the work sensor of the sensor unit 13, and the thus calculated error is sent to the mechanical data base 3a of the data base 3 via the data correcting unit 15, so that the portion of the mechanical data base 3a concerned may be corrected and renewed. The processing error measured by the work sensor of the sensor unit 13 may be sent to the correcting unit 5d of the tool path deciding unit 5, and the correcting data is created here from the processing error data, and the correcting tool path may be created in the tool path creating unit 5b, so that processing may be conducted again.

Next, referring to FIG. 28, the estimating calculation unit 7 will be explained below.

The estimating calculation unit 7 includes a processing state simulation unit 7a, machine behavior simulation unit 7b, work simulation unit 7c, and tool behavior simulation unit 7d.

The processing state simulation unit 7a receives the processing profile data 1a and the work data 1b from the input data base 3f. Further, the processing state simulation unit 7a receives the size and profile of the tool and tool holder and the size and profile of the main shaft end unit, which have been decided by the processing process deciding unit 5a, from the tool/holder data base 3b. Further, the processing state simulation unit 7a receives a quantity of feed per one blade calculated and decided in the tool path creating unit 5b, a quantity of cutting, a quantity of pickfeed, a tool path and a processing pattern. Further, the processing state simulation unit 7a receives a primary shaft rotating speed and a feed speed decided by the processing condition deciding unit 5c.

Prior to processing, that is, when the tool path deciding unit 5 first creates the tool path and others, the processing simulation unit 7a estimates whether or not the tool, tool holder and main shaft end portion interfere with the workpiece from the processing profile data 1a, workpiece data 1b, profiles and sizes of the tool, tool holder and main shaft end portion, tool path and processing pattern. In the case where the occurrence of interference is estimated in a processing region in the process of processing, the processing state simulation unit 7a gives a command to the processing process deciding unit 5a so that the processing region concerned can be a region in which processing is prohibited. In this case, when the region in which processing is prohibited can be processed by other tools or when the processing pattern of the region in which processing is prohibited can be changed, the processing process deciding unit 5a changes the tool or the processing pattern, so that the processing region, tool, processing pattern and processing order are decided again and sent to the tool path deciding unit 5. Then, the above procedure is repeated. In the case where the tool and processing pattern can not be changed, the processing process deciding unit 5a sends a processing order, in which the region in which processing is prohibited is excluded from the processing process, to the tool path deciding unit 5.

Figure 29A:
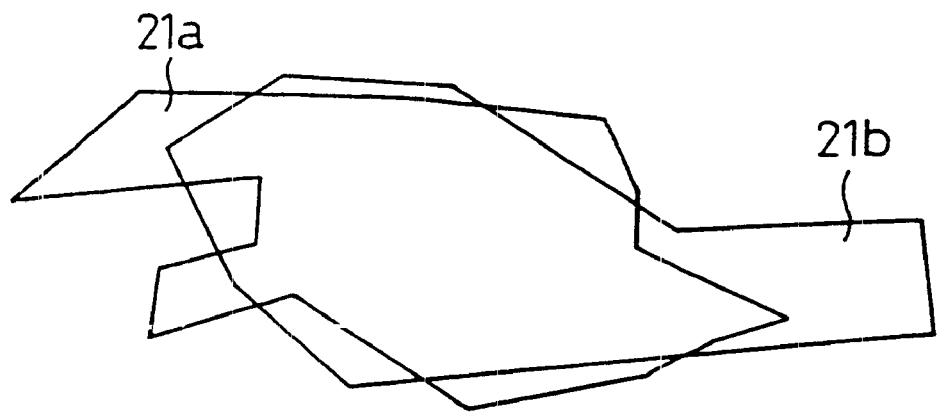
FIG. 29A is a schematic illustration for explaining a method of deciding a processing region.
Figure 29B:
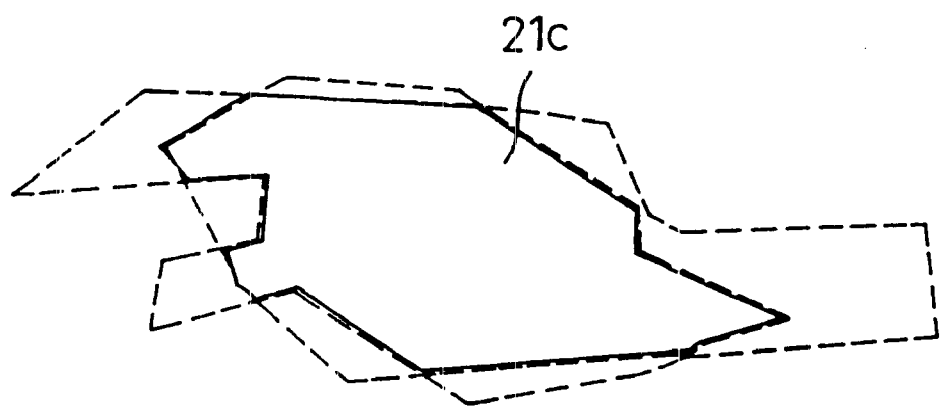
FIG. 29B is a schematic illustration for explaining a method of deciding a processing region.

Referring to FIGS. 29A and 29B, explanations will be made into an example of the method of deciding a processing region into which the result of estimating calculation is incorporated. In the case where the region 21a in which no interference is caused with respect to a tool is estimated by the calculation conducted in the processing state simulation unit 7a, when the region in which processing can be conducted with the tool is expressed by the region 21b, the surface inclination angle of which is not more than 66° as shown in FIG. 29A, the region in which both the region 21a and the region 21b are overlapped with each other is defined as the processing region 21c as shown in FIG. 29B.

The processing process deciding unit 5a can decide an overlapping region to be the region in which processing is allowed. In the above overlapping region, the processing region decided by the check of interference of the tool with the workpiece by the same method as that shown in FIGS. 29A and 29B, the processing region decided by the check of interference of the tool with the workpiece which has been arbitrarily decided with respect to the processing profile data 1a inputted from the input unit 1, and the processing region decided by the surface inclination angle, the radius of curvature of the surface and the depth of the processing profile data inputted from the input unit overlap each other.

Even after the processing has been started, the processing state simulation unit 7a conducts the check of interference in the same manner in real time. In the case where the occurrence of interference is estimated as a result of the check, data of the estimation of the occurrence of interference is sent out to the tool path creating unit 5b. The tool path creating unit 5b calculates and creates a tool path for avoiding the occurrence of interference, that is, the tool path creating unit 5b calculates and creates an interference avoiding tool path by which the tool can be turned aside in the direction of Z-axis.

While the processing is being actually conducted, the processing state simulation unit 7a estimates an in-corner unit of the workpiece, which is being processed, according to the processing profile data 1a, work data 1b, processing pattern and data of the tool path. The result of this estimation is sent to the processing condition deciding unit 5c, and the processing condition deciding unit 5c decides a processing condition by which the feed speed of the tool is decreased at the in-corner unit.

Further, the processing state simulation unit 7a estimates and calculates a processing load from the work data 1b and also from a quantity of feed of tool per one blade, a quantity of cutting, a quantity of pick-feed and tool path which are decided and calculated by the tool path creating unit 5b and also from the main shaft rotating speed and feed speed decided by the processing condition deciding unit 5c. Further, the processing condition simulation unit 7a estimates a profile of the workpiece at present, which is being processed, from the tool path and also estimates a contact point of the tool with the work and a weight of the workpiece, from the processing data 1a and work data 1b, and also from the tool decided by the processing process deciding unit 5c and the profile and size of the tool holder and the end unit of the main shaft, and also from a quantity of pick-feed and tool path decided and calculated by the tool path creating unit 5b.

The processing state simulation unit 7a estimates an inertial load of the workpiece according to an estimated change in the weight of the workpiece and a processing condition decided by the processing condition deciding unit 5c. This estimated inertial load is sent to the numerically controlled unit 9, and a parameter of the servo system 9b of the numerically controlled unit 9 is corrected.

In the case where the occurrence of air-cut is estimated in which the workpiece is not cut while the tool is moving in a tool path according to the estimation of a contact point of the tool with the workpiece, the processing state simulation unit 7a sends the data of the occurrence of air-cut to the processing condition deciding unit 5c. Due to the foregoing, it is possible for the processing condition deciding unit 5c to give a command to the numerically controlled unit 9 so that the tool can be moved at the maximum feed speed when the tool is moved along the tool path passing through a region in which the occurrence of air-cut is estimated.

The mechanical behavior simulation unit 7b estimates thermal deformation of the machine tool 11 according to the data of the thermal deformation characteristic of the machine with respect to temperature stored in the mechanical data base 3a and also according to the temperature data sent from the temperature sensor of the sensor unit 13. Also, the mechanical behavior simulation unit 7b estimates deformation of the machine tool 11 by the weight of the workpiece according to the weight data of the workpiece estimated and calculated by the processing state simulation unit 7a and also according to the data of the deformation characteristic of the machine by the weight of the workpiece stored in the mechanical data base 3a.

In the work simulation unit 7c, the processing profile data 1a and the work data 1b are received from the input data base 3f, and the size and profile of the tool and tool holder decided by the processing process deciding unit 5c and the profile and size of the main shaft end unit are received. The work simulation unit 7c receives a quantity of feed of the tool per one blade, a quantity of cutting, a quantity of pick-feed, tool path and processing pattern which are decided and calculated by the tool path creating unit 5b. Further the work simulation unit 7c receives a main shaft rotating speed and feed speed decided by the processing condition deciding unit 5c. The work simulation unit 7c estimates and calculates an intermediate profile of the workpiece which is processed presently, and the result of the estimating calculation is sent to the processing state simulation unit 7a and the mechanical behavior simulation unit 7b.

The tool behavior simulation unit 7d estimates a quantity of tilt and a quantity of deviation from the data of tilt and deviation with respect to the processing load estimated by the processing state simulation unit 7a and also with respect to the tool load stored in the tool/holder data base 3b. A quantity of abrasion and distribution of abrasion are estimated and calculated from the data of the tool life stored in the tool/holder data base 3b and also from the processing load, processing contact point, quantity of cutting and processing time estimated from the processing state simulation unit 7a. The abrasion distribution is to estimate an abrasion portion, for example, in the case of a ball end mill, it is estimated whether or not an end portion is worn, or it is estimated whether or not what portion distant from the end portion is worn, or it is estimated whether or not a straight portion is worn. According to the estimating calculation of abrasion, it is judged whether or not the tool has served its life time. Further, the estimated values are corrected by a change in the profile of the rotating tool such as the diameter of the tool, length of the tool, position of the center and posture of the tool according to the result of detection conducted by the tool sensor of the sensor unit 13.

A quantity of tilt of the tool estimated and calculated by the tool behavior simulation unit 7d is sent to the correcting unit 5d of the tool path deciding unit 5. When the estimated quantity of tilt of the tool is larger than a predetermined value, it is sent out to the tool path creating unit 5b so that a tool path, in which a tilt of the tool is considered, can be created. For example, when a processing load is heavy in the case where the work and the tool are relatively moved in the horizontal direction, the tool is deformed in such a manner that it is tilted forward with respect to the moving direction. Therefore, the end portion of the tool is moved being delayed compared with the coordinate position of the main shaft. Therefore, it is necessary to correct a quantity of feed so that the end portion of the tool can be moved to a predetermined processing position for conducting necessary processing. Due to the foregoing, processing can be carried out with higher accuracy.

Next, the operator changing operation judging unit 5f will be explained below.

In some cases, while automatic processing is being conducted in the machine tool 11, the operator watches an intermediate profile of the workpiece which is being processed and wants to change the tool path according to his experience. Also, in some cases, while automatic processing is being conducted in the machine tool 11, the operator wants to change the processing condition which has been automatically presented by the control device 100. The operator changing operation judging unit 5f can change the processing condition and the tool path presented by the control device 100.

That is, the operator changing control unit 5f responds to the tool path changing operation command 1c, which has been inputted from the input unit 1, the manual operation command 1d and processing condition changing operation command 1e, and interrupts the numerically controlled unit 9 during the processing, so that the operator can change the processing process.

Figure 30:
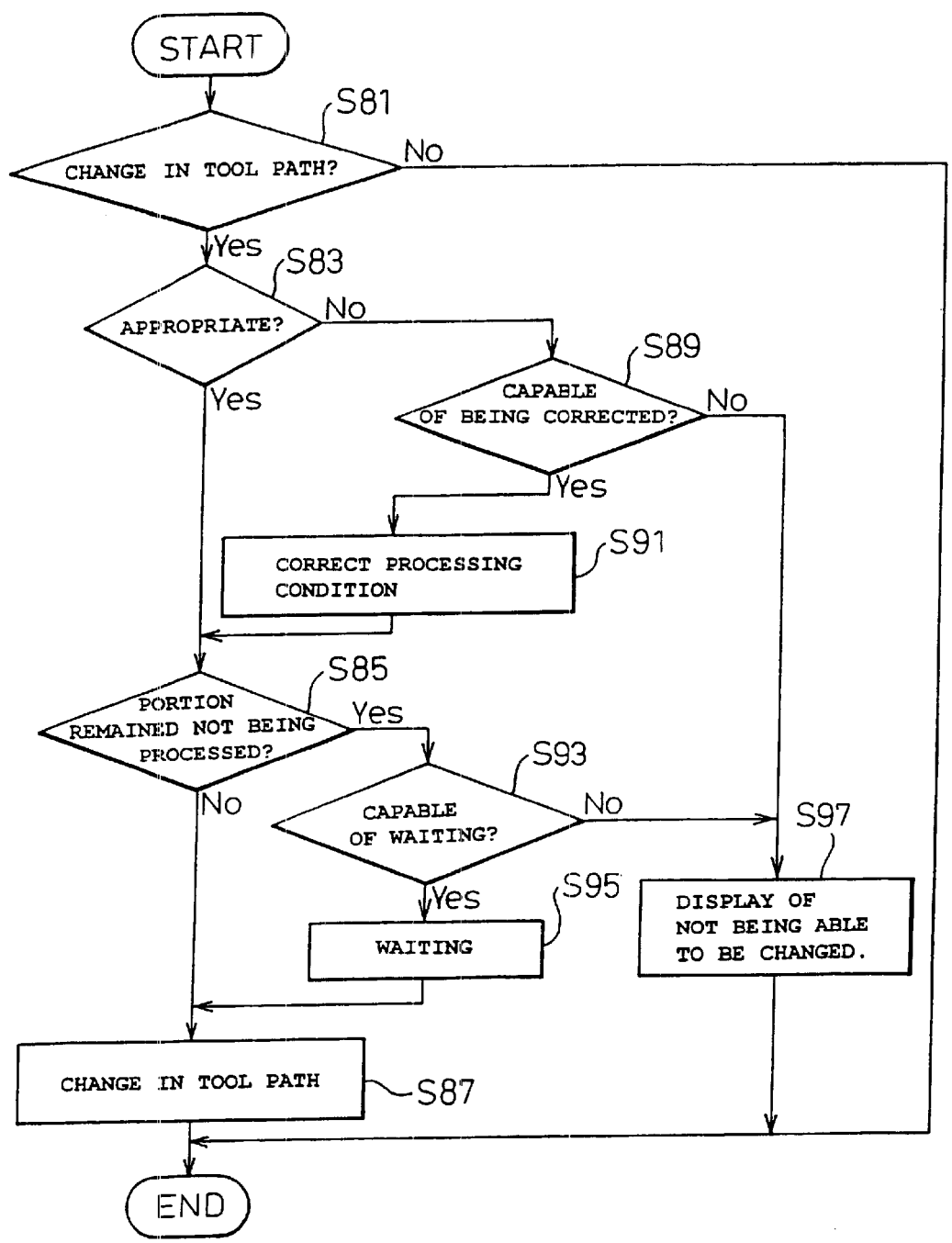
FIG. 30 is a flow chart of a method of operation of changing a tool path conducted by an operator.

Referring to FIG. 30, a changing operation of the tool path conducted during the processing will be explained below.

First, in step S81, it is judged whether or not the tool path changing operation command 1c is inputted. When the tool path changing operation command 1c is not inputted into the input unit 1, that is, when the result is No in step S81, the operator changing operation judging unit 5f conducts no processing, and the processing is continued. When the tool path changing operation command 1c is inputted into the input unit 1, that is, when the result is Yes in step S81, the operator changing operation judging unit 5f judges in step S83 whether or not the change in the tool path is appropriate for the processing condition such as the present feed speed and the main shaft rotating speed.

When it is judged that the change in the tool path is appropriate, that is, when the result is Yes in step S83, it is judged in step S85 whether or not a portion, in which no cutting is conducted, is left on the processing surface of the workpiece. This judgment can be made according to the data of the estimating calculation unit 15. When it is judged that all portions on the workpiece surface have been cut, that is, when the result is No in step S83, the operator changing operation judging unit 5f gives a tool path changing command to the tool path creating unit 5b in step S87.

When it is judged that the change in the tool path is not appropriate (step S83), it is judged in step S89 whether or not the tool path can be changed by changing the processing condition. When it is judged that the tool path can be changed by changing the processing condition, that is, when the result is Yes in step S89, the operator changing operation judging unit 5f gives a command to the processing condition deciding unit 5c in step S91 so that the processing condition can be changed to a condition by which the tool path is changed appropriately. Then, the program proceeds to step 85 described above, and it is judged whether or not a portion, in which no cutting is conducted, exists. When it is judged in step S89 that the tool path can not be appropriately changed even if the processing condition is changed, that is, when the result is No in step S89, the operator changing operation judging unit 5f gives a command to the display unit 17, which will be described later, in step S97, wherein the command indicates that the change can not be accepted.

When it is estimated in step S85 that a portion, in which no cutting is conducted, exists, that is, when the result is Yes in step S85, the change in the tool path is made to wait in step S93, that is, the tool path is changed after the present processing process has been continued for a predetermined period of time. When it is estimated that a portion, in which no cutting is conducted, does not exist, that is, when the result is Yes in step S93, the change in the tool path is made to wait for a predetermined period of time in step S95, and then the tool path is changed in step S87. When it is judged that a portion, in which no cutting is conducted, exists even after the change of the tool path is made to wait for a predetermined period of time, that is, when the result is No in step S93, it is displayed, in step S97, that the change can not be received.

Figure 31:
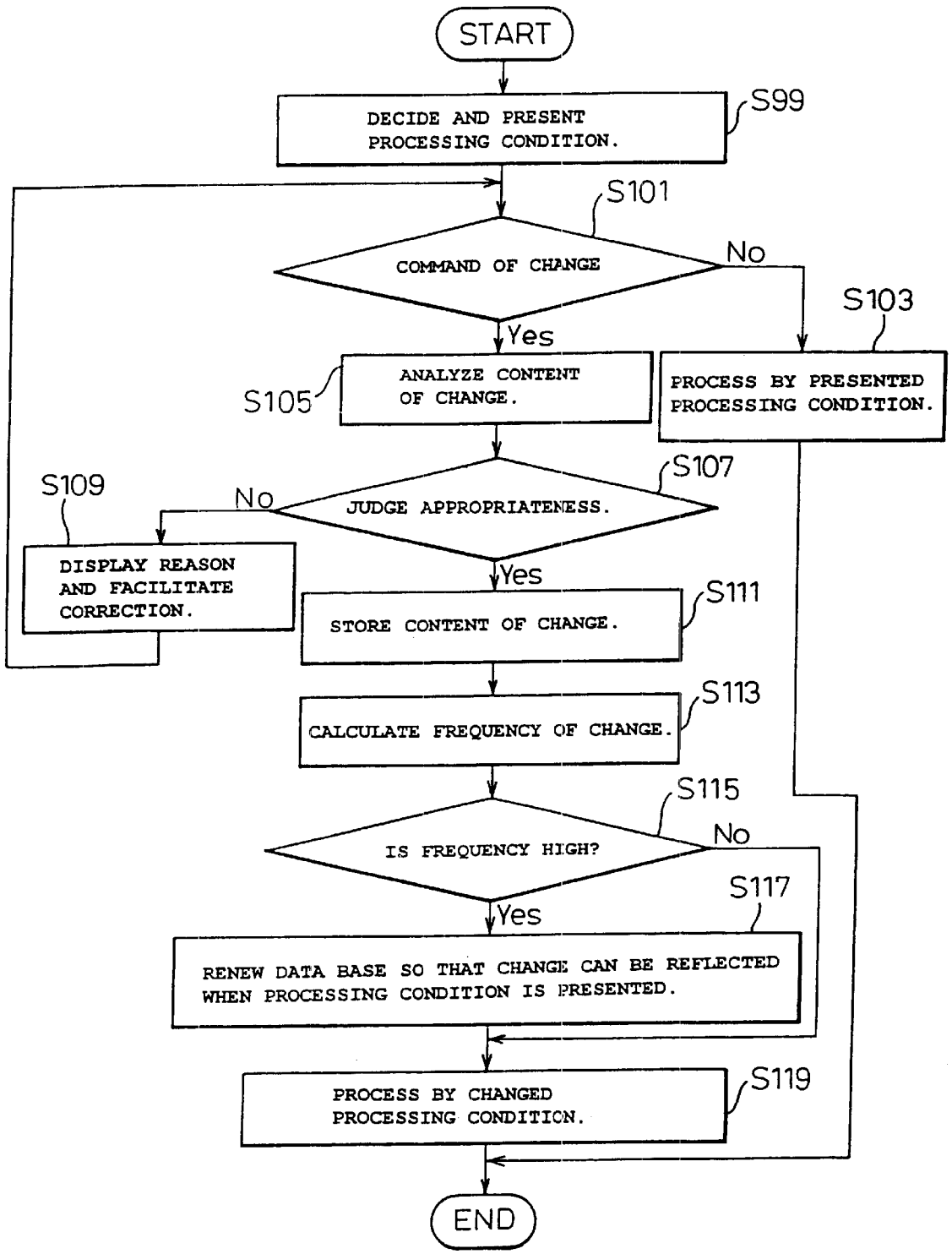
FIG. 31 is a flow chart of a method of operation of changing a processing condition conducted by an operator.

Next, referring to FIG. 31, a changing operation of the processing condition conducted by an operator will be explained below in which the processing condition is changed by the operator from the processing condition automatically presented by the control device 100 at the start of processing to the processing condition presented by the operator.

As described before, when the operator inputs the processing profile data 1a and the work data 1b into the input unit 1, the tool path deciding unit 5, especially the processing condition deciding unit 5c presents a processing condition to the operator according to the input into the input unit 1 (step S99). This processing condition is decided by reference to the data of the processing condition based on the actual results, experiences and prior art stored in the data base 3. On the other hand, in many cases, a user or operator uses a processing condition indicated by his own experiences different from the data stored in the data base 3. In some cases, being pressed by the delivery date, it is desired to adopt a processing condition by which the processing time can be shortened compared with the processing condition presented by the control device 100.

In step S101, it is judged whether or not the processing condition changing operation command 1e is inputted. Unless the operator inputs the processing condition changing operation command 1e from the input unit 1, that is, when the result is No in step S101, the processing is started by the processing condition presented in step S99 (step S103).

When the operator inputs the processing condition changing operation command 1e from the input unit 1, that is, when the result is Yes in step S101, the content of change is analyzed in step S105, it is judged whether or not the content of change is appropriate (step S107). When it is judged that the content of change is not appropriate, that is, when the result is No in step S107, the operator changing operation judging unit 5f sends a command to the display unit 17 in step S109 so that the reason why the change in the processing condition is not appropriate can be displayed in the display unit 17 and the processing condition can be changed or corrected. After that, the program returns to step S101. When the operator inputs the change in the processing condition again, it is judged whether or not the change in the processing condition is appropriate as described before. When it is judged in step S107 that the change in the processing condition is not appropriate, it is possible to reset the change in the processing condition into the processing condition presented in step S99.

When it is judged in step S107 that the change in the processing condition is appropriate, that is, when the result is Yes in step S107, the content of change in the processing condition by the operator is stored in the user data base 3g in step S111. The content of change in the processing condition by the operator is analyzed and classified referring to the contents of change in the past, and the frequency of changes in the processing condition having the same content is calculated (step S113). In the case where the frequency of the change is high, it can be judged that the operator or user desires a change, the frequency of which is high. Therefore, it is judged in step S115 whether or not the frequency of the change is higher than a predetermined threshold value. When the frequency of the change is high, that is, when the result is Yes in step S115, the contents of the user data base 3g are corrected so that the processing condition in which the frequency of the change is high can be preferentially presented by reflecting the intention of the operator or user when the processing condition is presented. At the same time, the contents of the data base 3 is renewed (step S117). Next, the workpiece is processed according to the corrected processing condition (step S119).

Further, the operator changing operation judging unit 5f makes it possible for the operator to conduct a manual operation.

Figure 32:
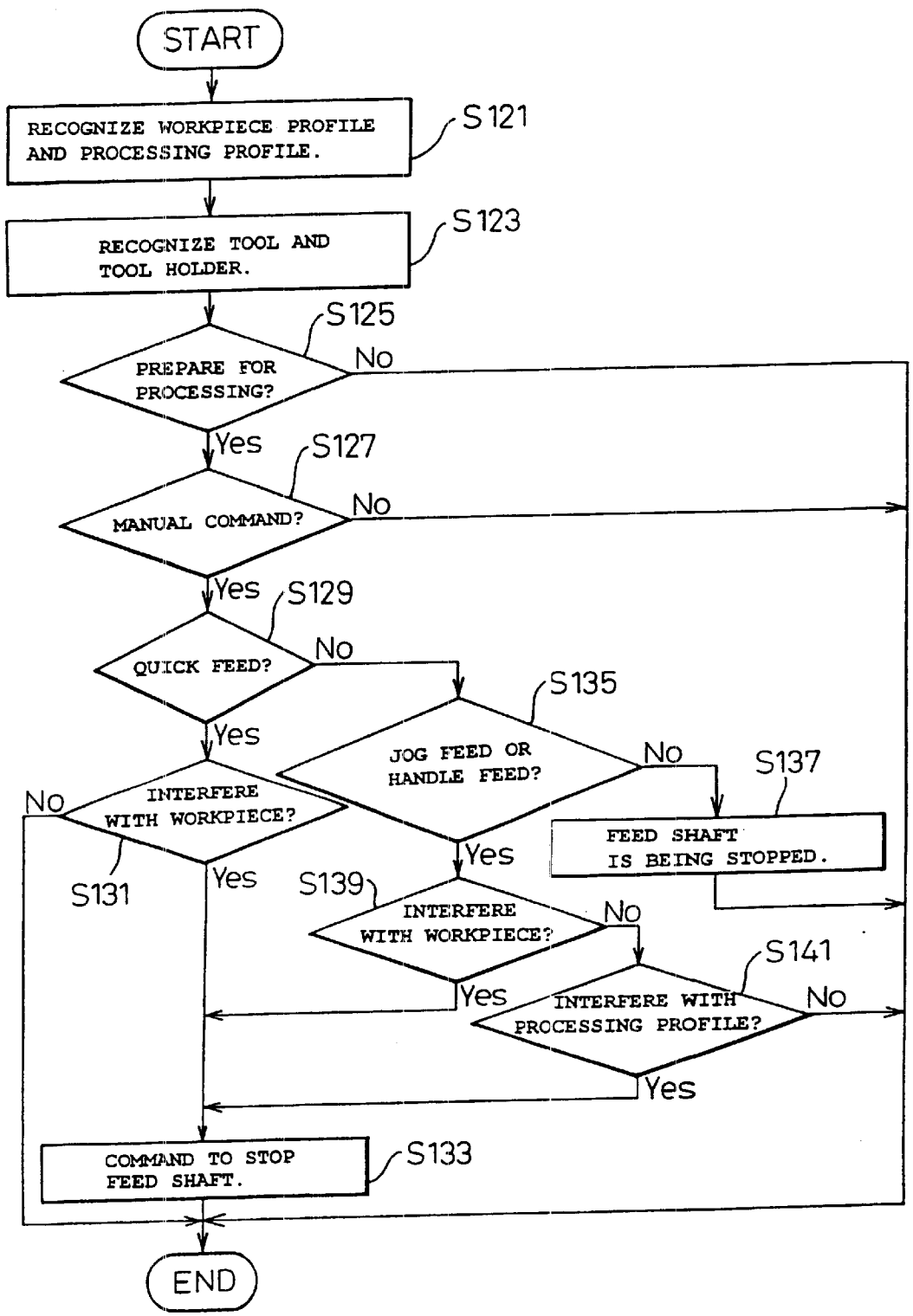
FIG. 32 is a flow chart of a method of manual operation conducted by an operator.
Figure 33:
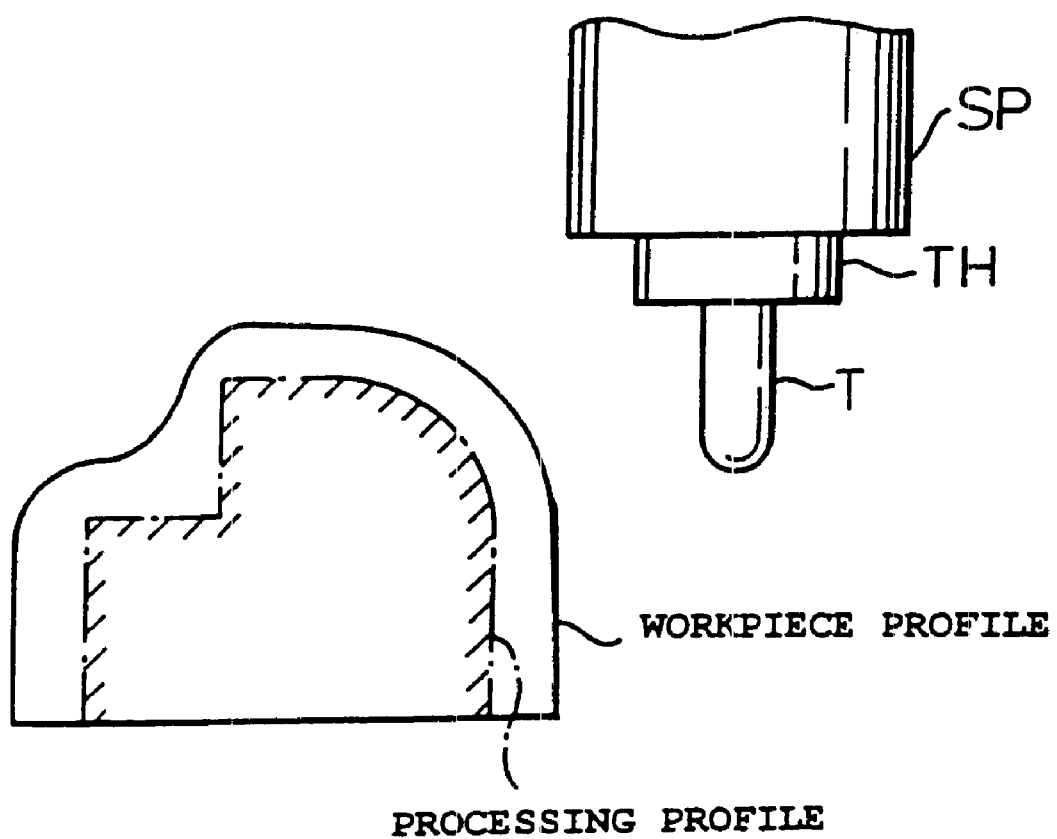
FIG. 33 is a schematic illustration for explaining a method of manual operation conducted by an operator.

Referring to FIGS. 32 and 33, as described before, when the operator inputs the processing profile data 1a and the work data 1b from the input unit 1, the control device 100 recognizes the processing profile, which is the final profile of the workpiece, and the profile of the workpiece before it is processed (step S121), and tool T and tool holder TH, which have been selected according to the processing profile data 1a, are recognized (step S123). Next, it is ensured whether or not the workpiece is fixed to the work table, whether or not tool T is attached to main shaft SP, or whether or not main shaft SP is rotated. In this way, it is judged whether or not the preparation for processing has been made. When the preparation for processing has not been made, that is, when the result is No in step S125, the operator changing operation judging unit 5f conducts no processing.

When the preparation for processing has been made, that is, when the result is Yes in step S125, it is judged in step S127 whether or not the manual operation command id is inputted. When the manual operation command id is not inputted, that is, when the result is No in step S127, the operator changing operation judging unit 5f conducts no processing. When the manual operation command id is inputted, it is judged whether or not the manual operation command 1d is a quick feed (step S129).

When the manual operation command 1d is a quick feed, that is, when the result is Yes in step S129, it is judged in step S131 whether or not tool T and tool holder TH interfere with the workpiece, especially it is judged whether or not tool T and tool holder TH interfere with the workpiece profile inputted into the input unit 1, according to the result of the estimating calculation conducted by the estimating calculation unit 7 as shown in FIG. 33. When it is judged that tool T and tool holder TH interfere with the workpiece, that is, when the result is Yes in step S131, the operator changing operation judging unit 5f gives a command to the numerically controlled unit 9 so that the feed shaft can be stopped (step S133). When it is judged that tool T and tool holder TH do not interfere with the workpiece, that is, when the result is No in step S131, the operator changing operation judging unit 5f conducts no processing in particular, and the operator is able to manually operate the feed shaft by a quick feed.

When the manual operation command 1d is not a quick feed, that is, when the result is No in step S129, it is further judged in step S135 whether the manual operation command 1d is a jog feed or the manual operation command 1d is a feed conducted by handle operation. when the manual operation command 1d is not either of them, that is, when the result is No in step S135, it is judged in step S137 that the shaft feed has been stopped, and the operator changing operation judging unit 5f conducts no operation any more.

When the manual operation command 1d is a jog feed or a feed conducted by the handle operation, that is, when the result is Yes in step S135, the operator changing operation judging unit 5f judges in step S139 according to the result of estimating calculation conducted by the estimating calculation unit 7 whether or not tool holder TH interferes with the workpiece, especially whether or not tool holder TH interferes with the workpiece profile. When it is judged that tool holder TH interferes with the workpiece, that is, when the result is Yes in step 139, the operator changing operation judging unit 5f gives a command to the numerically controlled unit 9 in step S133 so that the feed shaft can be stopped.

When it is judged that tool holder TH does not interfere with the workpiece, that is, when the result is No in step 139, the operator changing operation judging unit 5f judges according to the result of estimating calculation conducted by the estimating calculation unit 7 in step S141 whether or not tool T interferes with the processing profile. When it is judged that tool T interferes with the processing profile, that is, when the result is Yes in step S141, the operator changing operation judging unit 5f gives a command to the numerically controlled unit 9 in step S133 so that the feed shaft can be stopped. When it is judged that tool T does not interfere with the processing profile, that is, when the result is No in step S141, the operator changing operation judging unit 5f conducts no processing in particular, and the operator operates the feed shaft by a manual jog feed or a handle operation feed.

Next, the cost calculating unit 5e will be explained below.

It is expected that the processing condition is changed by the operator in connection with the delivery date and the processing cost. That is, it is common to adopt the following procedure. Even if the control device 100 presents the most appropriate processing condition by giving consideration to the actual results obtained in the past, the rules of experiences and the prior art, a main shaft rotating speed and a feed speed, which are a little higher than the most appropriate values, can be selected by the operator because the delivery date is near at hand. Therefore, the cost calculating unit 5e supports the operator so that the operator can select the processing condition, in which the cost and the delivery date are considered, by calculating the cost or profit of the presented processing condition or the changed processing condition.

Figure 35:
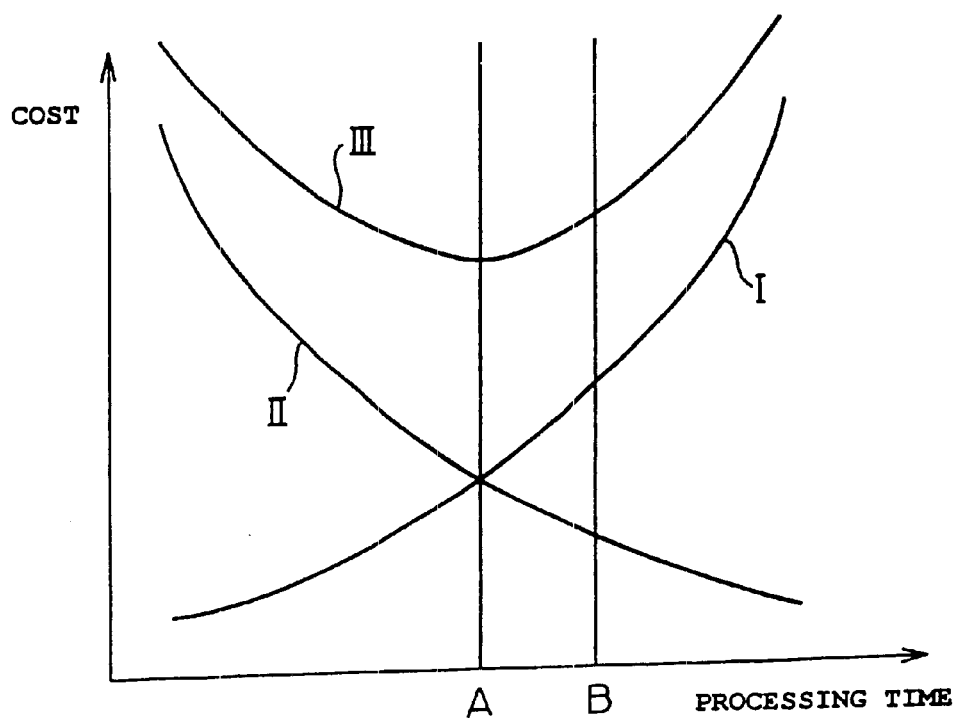
FIG. 35 is a view showing a method of operation of changing a processing condition in which consideration is given to the manufacturing cost.
Figure 36:
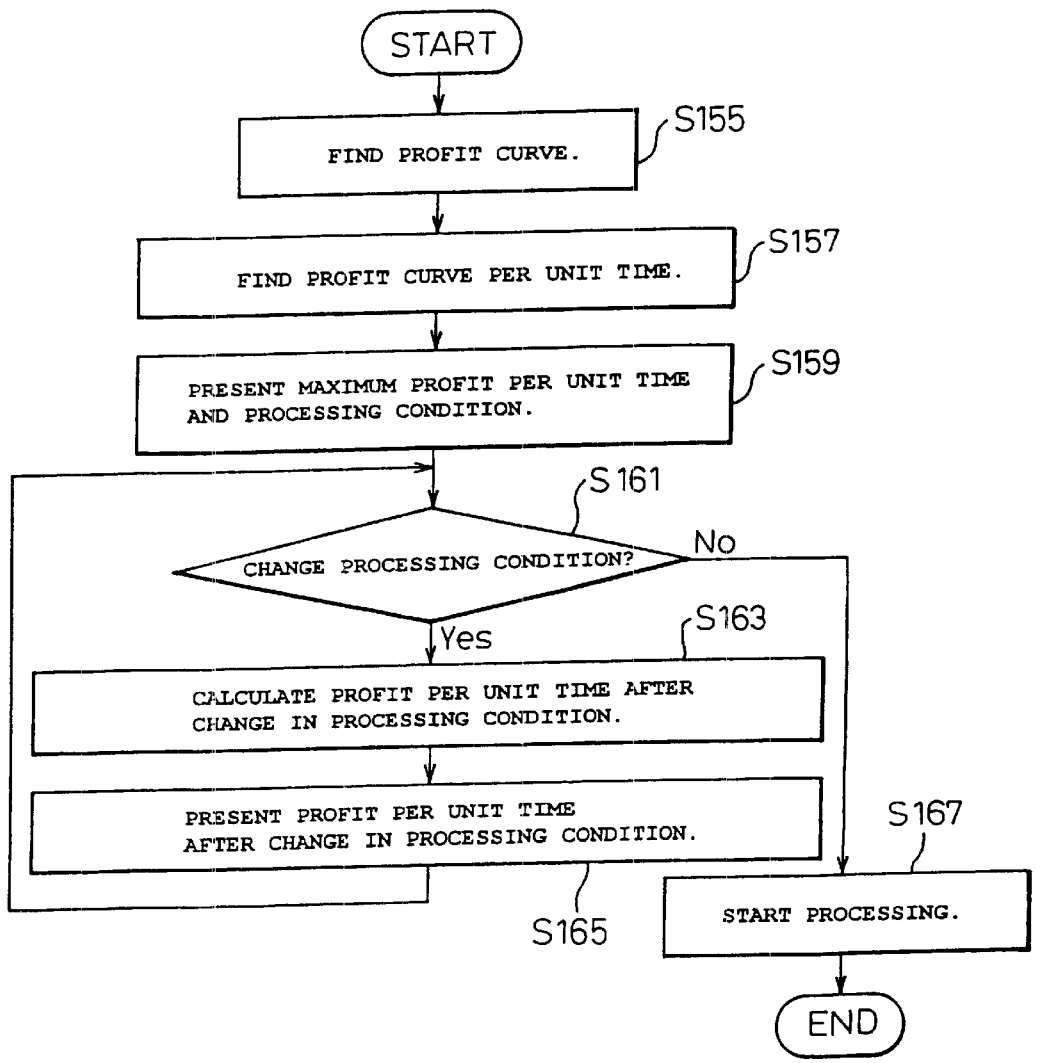
FIG. 36 is a flow chart of a method of operation of changing a processing condition in which consideration is given to the manufacturing cost.

Referring to FIG. 35, curves of the cost with respect to the processing time are shown. In general, when the processing time is extended, the running cost of the machine tool such as electric power used for the machine tool and cutting oil consumed for the machine toll, which is represented by curve I, is raised, and the tool cost, which is represented by curve II and determined by the replacement of the tool mainly required for abrasion of the tool, is lowered. The total cost of processing is represented by curve III, and processing time A exists in which the minimum cost can be given. In this embodiment, the cost calculating unit 5e supports the operator to select the processing condition by using the cost curve while the operator is giving consideration to the cost and delivery date.

First, in FIG. 35, the cost curve shown by curve III is found (step S143). Essentially, the cost curve can be found by the running cost and the tool cost of the machine tool. Further, consideration may be given to the personnel expenses and the light and fuel expenses when the cost curve is found. Next, in FIG. 35, the minimum cost represented by A and the processing condition at that time are found, and the thus found processing condition is presented to the operator via the display unit 17 in step S145. In this case, not only the values but also the cost curve shown in FIG. 35 may be shown.

As described before, in some cases, the operator changes the processing condition when he gives consideration to the presented processing condition, cost and delivery date. In step S147, the cost calculating unit 5e watches whether or not the processing condition is changed. Unless the processing condition is changed, that is, when the result is No in step S147, the processing is started in step S149 as it is. When the operator changes the processing condition, that is, when the result is Yes in step S147, the cost under the changed processing condition is calculated in step S151, and the cost is presented in step S153, and the program returns to step S147. When the operator selects the cost and the processing condition, the processing is started in step S149. When the operator desires to change the cost and the processing condition again, the change is calculated and presented in steps S151 and S153. Concerning the method of changing the processing condition, it is possible to adopt the method of inputting the processing condition changing operation command 1e as described before, however, it is also possible to adopt the method in which the control device 100 selects the processing condition so that it can agree with the inputted processing time while the processing time is used as a parameter. For example, in FIG. 35, the processing time may be changed from processing time A, at which the minimum cost can be given, to processing time B.

Figure 34:
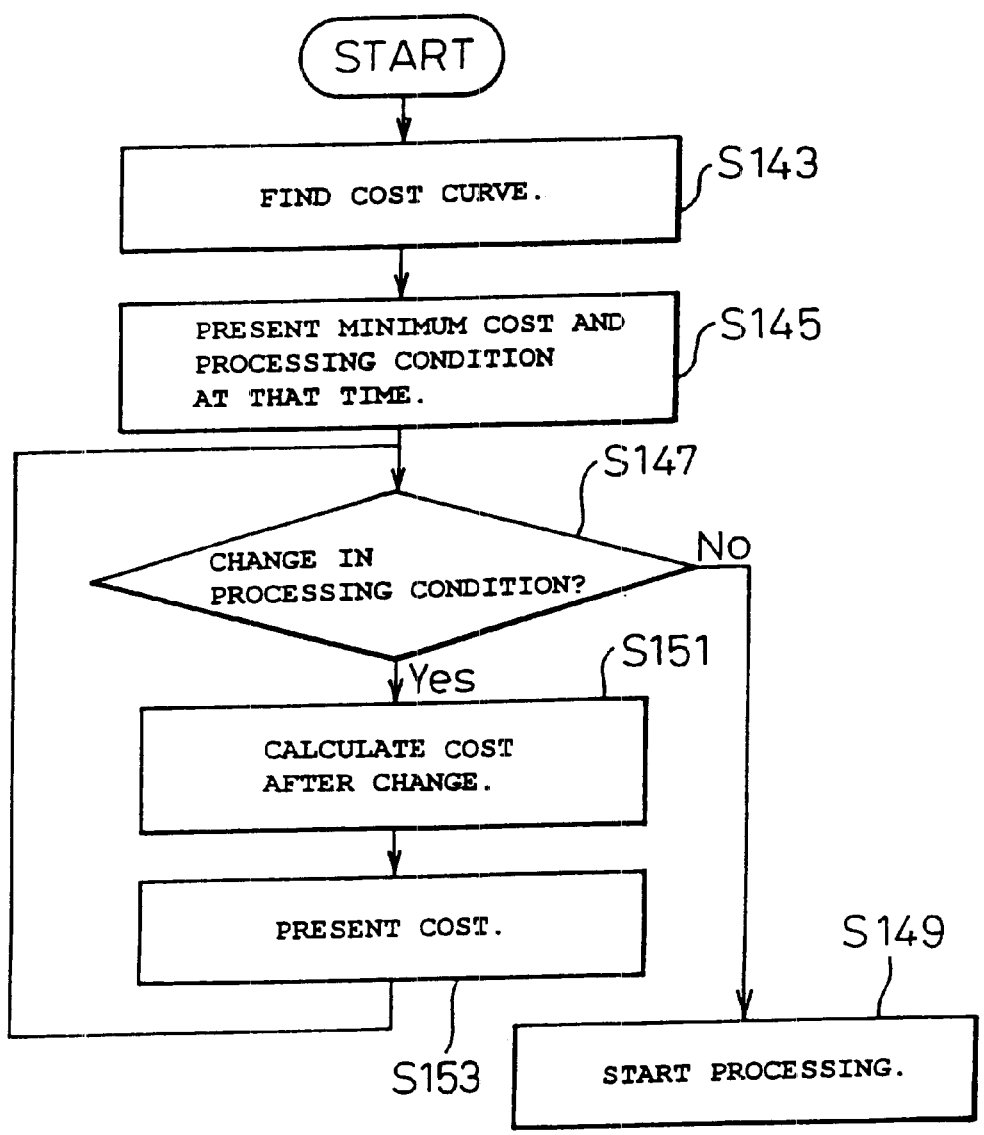
FIG. 34 is a flow chart showing a method of operation of changing a processing condition in which consideration is given to the manufacturing cost.
Figure 37A:
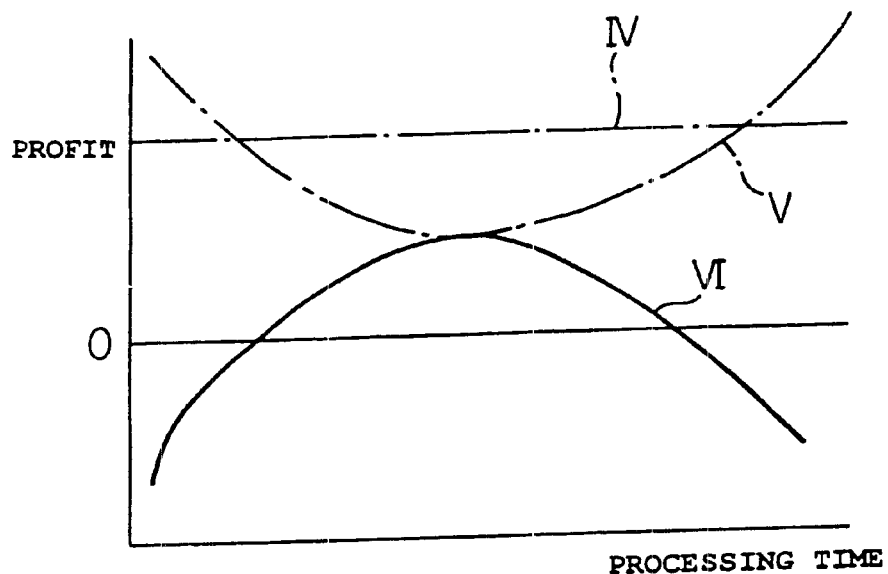
FIG. 37A is a curve of profit for explaining a method of operation of changing a processing condition in which profit per unit time is considered.
Figure 37B:
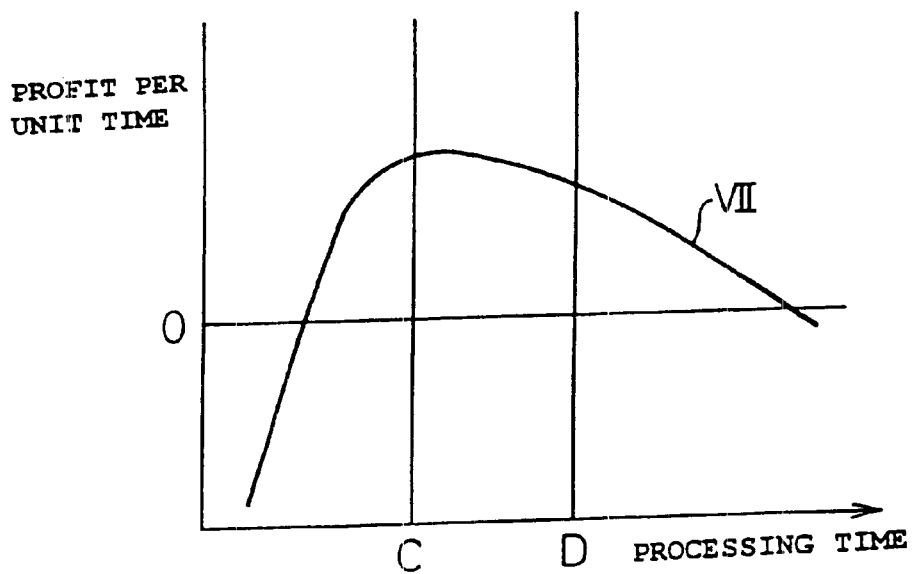
FIG. 37B is a curve of profit per unit time.

Referring to FIGS. 34 and 35, explanations have been made to a case in which the selection of the processing condition by the operator is supported when only the total cost is presented to the operator. However, when the sales of the products concerned have already been known, it is possible to present the profit or the ratio of profit to the operator. Referring to FIG. 37A, curve V is a total cost curve corresponding to curve III shown in FIG. 35, and straight line IV represents the sales, and curve VI represents the profit obtained when the total cost is deducted from the sales. Of course, when the cost is increased higher than the sales, no profit can be obtained. When profit curve VI is divided by time, it is possible to obtain profit curve VII per unit time shown in FIG. 37B. In FIG. 37B, condition C is shown in which the profit per unit time can be maximized.

First, profit curve VI is found in step S155, and when profit curve VI is divided by time, profit curve VII per unit time is found in step S157. Next, the maximum profit per unit time and the processing condition at that time are presented via the display unit 17. As described before, in some cases, the operator changes the processing condition when he gives consideration to the presented processing condition, profit per unit time and delivery date. In step S161, the cost calculating unit 5e watches whether or not the processing condition is changed. Unless the processing condition is changed, that is, when the result is No in step S161, the processing is started in step S167 as it is. When the operator changes the processing condition, that is, when the result is Yes in step S161, the profit per unit time under the changed processing condition is calculated in step S163, and the cost is presented in step S165, and the program returns to step S161. When the operator selects the profit per unit time and the processing condition, the processing is started in step S167. When the operator desires a change again, the change is calculated and presented in steps S163 and S165. As a method of changing the processing condition, it is possible to adopt a method of inputting the processing condition changing operation command 1e described before, however, it is also possible to adopt the method in which the control device 100 selects the processing condition so that it can agree with the inputted processing time while the processing time is used as a parameter. For example, it possible to change the processing time from processing time C, at which the maximum profit per unit time can be obtained, to processing time D in FIG. 37B.

Next, the display unit 17 will be explained below. The display unit 17 includes an image processing unit 17a and a monitor 17b such as CRT. The display unit 17 can display the processing region, processing pattern, tool profile and control number which are decided by the processing process deciding unit 5a of the tool path deciding unit 5. The image processing unit 17a receives the data of the radius of curvature, inclination angle and depth of the processing region from the processing process deciding unit 5a and creates the data for displaying three-dimensionally by coloring each region.

Figure 38:
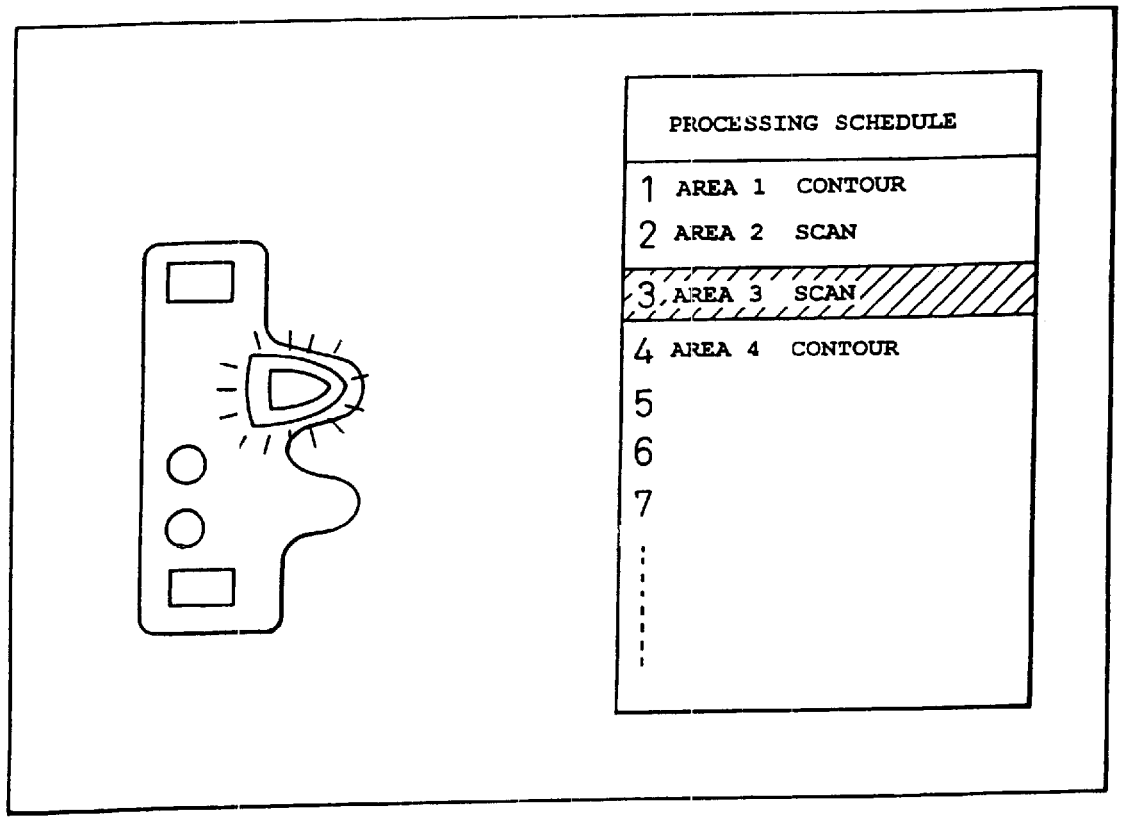
FIG. 38 is a schematic illustration for explaining a display of a state of processing.

Although the details are not shown in FIG. 1, the display unit 17 is connected with the data base 3, estimating calculation unit 7, numerically controlled unit 9 and sensor unit 13. Information sent from each component is displayed by means of graph or text. For example, the display unit 17 is capable of displaying the result of the check of interference of the tool with the workpiece on a graph according to the data sent form the estimating calculation unit 7. Further, the display unit 17 may display the comparison of the data of processing accuracy in the processing profile data inputted into the input data base 3f with the data of measurement of the work profile measured by the sensor unit 13. As described before, it is possible to display a portion of the workpiece, in which no cutting was conducted, on a graph by the interference avoiding circuit for avoiding the interference of the workpiece with the tool. Further, as shown in FIG. 38, it is possible to display the states of processing such as "Tool path has been created.", "Workpiece is being processed.", and "Workpiece has been processed.". Also, it is possible to display the processing regions such as "Area 1: processing of contouring" and "Area 2: scanning processing" which are displayed while being colored according to the state of processing. Further, the corresponding region may be highlighted while being turned on and off and furthermore the corresponding region may be colored.

The mode of operation of the embodiment of the present invention will be explained as follows.

First, when the operator inputs the processing profile data 1a and the work data 1b from the input unit 1 into the data base 3, the processing process deciding unit 5a of the tool path deciding unit 5 selects and decides the processing region, tool, processing pattern and processing process according to the processing profile data 1a and the work data 1b, which have been inputted, and the data stored in the data base 3. Next, the tool path creating unit 5b of the tool path deciding unit 5 decides the tool path, and the processing condition deciding unit 5c decides the processing condition. The machine tool 11 is driven and controlled according to the mechanical drive data such as the tool path and the processing condition, which have been created and decided in this way, via the numerically controlled unit 9. In this way, the workpiece can be processed to a product.

At this time, the estimating calculation unit 7 conducts various estimating calculations such as a processing load and occurrence of interference of the tool with the work according to the processing profile data 1a and the workpiece data 1b, which have been inputted from the input unit 1 by the operator, and various data stored in the data base 3. The results of this estimating calculation are sent to the processing process deciding unit 5a of the tool path deciding unit 5, and the tool, processing pattern and processing process are decided according to the results of calculation conducted by the estimating calculation unit 7. In the same manner, the tool path is decided by the tool path creating unit 5b of the tool path deciding unit 5 according to the results of estimating calculation conducted by the estimating calculation unit 7, and also the processing condition is decided by the processing condition deciding unit 5c. The cost and profit corresponding to the above decision are calculated by the cost calculating unit 5e. When the operator changes the tool path and the processing condition and conducts manual operation, the operator changing operation judging unit 5f watches the above operation conducted by the operator.

As described above, according to the present invention, the estimating calculation unit 7 previously conducts various estimating calculations such as a processing load and occurrence of interference of the tool with the workpiece according to the processing profile data 1a and the workpiece data 1b, which have been inputted from the input unit 1 by the operator, and various data stored in the data base 3. According to the conventional method, the processing is conducted first, and the state of the processing is detected and fed back, so that the machine tool can be controlled most appropriately. On the other hand, according to the present invention, the estimating calculation is conducted first, and then feed-forward control is conducted according to the result of the estimating calculation. Further, the detected processing state is fed back, so that the accuracy of the feed-forward control can be more enhanced. Due to the foregoing, the optimum speed becomes faster than that of the conventional method, and a highly accurate processing can be carried out faster than that of the conventional method.

Figure 39A:
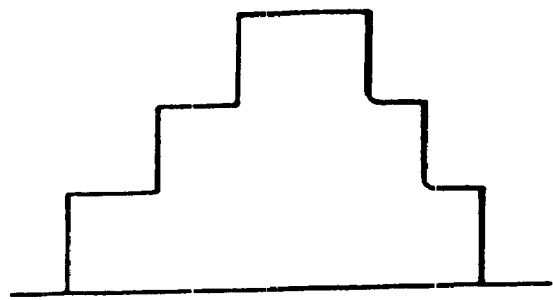
FIG. 39A is a schematic illustration for explaining the effect of the present invention, that is.
Figure 39B:
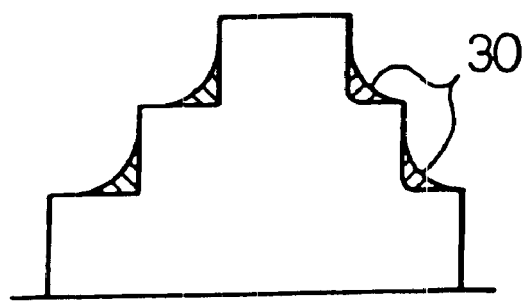
FIG. 39B is a side view of a workpiece in which comparison is made between a case of processing in which the control device of the present invention is used and a case of processing in which the device of the prior art is used.

Comparative examples in which the prior art and the present invention are compared with each other are shown in FIGS. 39A and 39B.

In the case where some portions 30 remain, as shown in FIG. 39B, unprocessed with respect to the profile shown in FIG. 39A, when processing is conducted at high processing speed, for example, at 16 m/min according to the prior art, the tool is given an excessively heavy load when it conducts processing on the portion 30 which have not been processed. Therefore, the processing accuracy is remarkably deteriorated, and the tool may be damaged, in the worst case. Even if the prior art is applied, the above problems can be solved when the feed speed of the tool is decreased, for example, when the feed speed of the tool is decreased to 200 mm/min, however, the processing time may be greatly increased. On the other hand, according to the present invention, the above problems are not caused even when the processing is conducted at a high feed speed. This effect is obtained by calculating the estimating value of the processing load by the estimating calculation unit 9, by previously checking the occurrence of interference of the tool with the workpiece, and furthermore by fully utilizing various data bases stored in the data base 3.

As explained above, according to the present invention, when the operator only inputs the profile data of the product to be manufactured and the profile data and material data of the workpiece to be processed, the workpiece can be automatically processed with high accuracy by an appropriate tool, tool path and processing condition in a short period of time.

What is claimed is:

1. A control device of a machine tool for processing a workpiece when processing profile data is inputted into the control device, comprising:
    an input means for inputting the processing profile data of a profile of a final workpiece and for inputting the workpiece data of material and a profile of the workpiece to be processed;
    a data storing means for storing at least one of the mechanical data of the machine tool to process the workpiece and the tool data of the tool mounted on the machine tool;
    a tool path deciding means for recognizing the profile of a non-processed workpiece and the profile to be finally formed in the workpiece, dividing the profile to be finally formed in the workpiece into a plurality of regions on the basis of the recognized profile to be finally formed in the workpiece, selecting a tool for each said divided region, selecting a machining pattern for machining the workpiece in each said divided region, recognizing a longitudinal direction in each said divided region to decide the longitudinal direction as a machining direction, and for creating a tool path to process the workpiece in each said divided region and for deciding a processing condition for processing the workpiece for each said divided region, such as a main shaft rotating speed of the machine tool and a feed speed of the workpiece, according to said data inputted by the input means and the data stored in the data storing means; and
    an operator changing operation judging means for recognizing and storing a changing operation of the operator with respect to the tool path and processing condition which have been created and decided by the tool path deciding means and also for judging whether or not the changing operation is appropriate and also for reflecting the changing operation on the creation and decision of the tool path and the processing condition.

2. A control device of a machine tool according to claim 1, wherein at least one of said mechanical data and said tool data stored in said data storing means is renewed by said changing operation recognized and stored in said operator changing operation judging means.

3. A control device of a machine tool for processing a workpiece when processing profile data is inputted into the control device, is comprising:
    an input means for inputting the processing profile data of a profile of a final workpiece and for inputting the workpiece data of material and a profile of the workpiece to be processed;
    a data storing means for storing at least one of the mechanical data of the machine tool to process the workpiece and the tool data of the tool mounted on the machine tool; and
    cost calculating means for calculating the processing cost of the workpiece according to the data inputted by the input means and the data stored in the data storing means wherein said processing profile data inputted by the input means also includes delivery time data which includes processing accuracy data and a processing schedule.

4. A control device of a machine tool according to claim 3, wherein said cost calculating means calculates the processing cost and also calculates the profit and loss of the workpiece according to said processing accuracy data and said delivery time data included in said processing profile data inputted by the input means and also according to the data stored in the data storing means.

5. A control device of a machine tool according to claim 3, wherein said cost calculating means also calculates the minimum processing cost of the workpiece.

6. A control device of a machine tool according to claim 3, further comprising a tool path deciding means for creating a tool path to process the workpiece and for deciding a processing condition for processing the workpiece such as a main shaft rotating speed of the machine tool and a feed speed of the workpiece according to said data inputted by said input means and said data stored in said data storing means, wherein said cost calculating means commands said tool path deciding means to create and decide at least one of a tool path and a processing condition by which the processing cost of the workpiece, being calculated according to the data inputted by the input means and the data stored in the data storing means, can be generated.

7. A control device of a machine tool according to claim 6, wherein said tool path deciding means includes a processing process deciding means for selecting a tool and a processing pattern and also deciding the processing process, and wherein said cost calculating means commands the tool path deciding means to select and decide the tool, the processing pattern and the processing process by which the processing cost of the workpiece, being calculated according to the data inputted by the input means and the data stored in the data storing means, can be generated.

8. A processing apparatus for processing a workpiece when processing profile data is inputted into the processing apparatus, comprising:

a machine tool for processing the workpiece;

an input means for inputting the processing profile data of a profile of a final workpiece and for inputting the workpiece data of material and a profile of the workpiece to be processed;

a data storing means for storing at least one of the mechanical data of the machine tool to process the workpiece and the tool data of the tool mounted on the machine tool;

a cost calculating means for calculating the processing cost of the workpiece according to the data inputted by the input means and the data stored in the data storing means;

an estimating calculation means for estimating at least a processing load or an occurrence of interference of the tool with the workpiece according to the data inputted by the input means and also according to the data stored in the data storing means;

a processing process deciding means for selecting a tool and processing pattern and deciding a processing process according to the data inputted by the input means, the data stored in the data storing means and the result of estimating calculation conducted by the estimating calculation means;

a tool path deciding means for creating a tool path to process the workpiece and deciding a processing condition for processing the workpiece such as a main shaft rotating speed of the machine tool and a feed speed of the workpiece according to the data inputted by the input means, according to the data stored in the data storing means, according to the result of estimating calculation conducted by the estimating calculation means, according to the tool selected and decided by the processing process deciding means, and also according to the processing pattern and the processing process;

an operator changing operation judging means for recognizing and storing a changing operation of the operator with respect to the tool, the processing pattern and the processing process which have been selected and decided by the processing process deciding means and also with respect to the tool path and processing condition which have been created and decided by the tool path deciding means and also for judging whether or not the changing operation is appropriate and also for reflecting the changing operation on the processing by the tool path deciding means and the processing process deciding means; and a numerically controlled means for controlling a motion of the machine tool by the tool, the processing pattern and the processing process, which have been selected and decided by the processing process deciding means, and also by the tool path and the processing condition which have been created and decided by the tool path deciding means.

* * * * *